(12) United States Patent
Ono

(10) Patent No.: US 6,819,436 B2
(45) Date of Patent: Nov. 16, 2004

(54) IMAGE CAPTURING APPARATUS AND DISTANCE MEASURING METHOD

(75) Inventor: Shuji Ono, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/790,187

(22) Filed: Mar. 2, 2004

(65) Prior Publication Data

US 2004/0165196 A1 Aug. 26, 2004

Related U.S. Application Data

(62) Division of application No. 09/878,398, filed on Jun. 12, 2001, now Pat. No. 6,724,490.

(30) Foreign Application Priority Data

Jun. 12, 2000 (JP) ........................................ 2000-176142

(51) Int. Cl.[7] .............................................. G01B 11/14
(52) U.S. Cl. ....................... 356/614; 356/622; 356/623; 356/624; 356/3.1; 356/4.07
(58) Field of Search ................................ 356/3.1, 4.07, 356/4.1, 5.09, 614, 622, 623, 624; 250/559.22, 599.23, 559.29, 559.31

(56) References Cited

U.S. PATENT DOCUMENTS

| | | | |
|---|---|---|---|
| 5,699,149 A | * | 12/1997 | Kuroda et al. |
| 6,148,270 A | * | 11/2000 | Nakajima et al. |
| 6,346,980 B1 | * | 2/2002 | Tani et al. |
| 6,538,751 B2 | | 3/2003 | Ono |

FOREIGN PATENT DOCUMENTS

| | | |
|---|---|---|
| JP | 61-155909 A | 7/1986 |
| JP | 62-46207 A | 2/1987 |
| JP | 63-233312 A | 9/1988 |
| JP | 10-48336 A | 2/1998 |
| JP | 11-94520 A | 4/1999 |

OTHER PUBLICATIONS

Inokuchi et al., Three–dimensional image measurement, Nov. 1990.
Kawakita, et al., Axi–Vision Camera, Oct. 11, 2001.

* cited by examiner

*Primary Examiner*—Ricky D. Shafer
(74) *Attorney, Agent, or Firm*—Birch, Stewart, Kolasch, & Birch, LLP

(57) ABSTRACT

An image capturing apparatus for obtaining information regarding a depth of a subject includes: an illumination unit operable to cast a first illumination light beam that mainly contains a first wavelength and has a first intensity distribution on a plane perpendicular to an optical axis of the first illumination light beam and a second illumination light beam mainly containing a second wavelength and a third wavelength and having a second intensity distribution on a plane perpendicular to an optical axis of the second illumination light beam onto the subject, the second and third wavelengths being different from the first wavelength, the second intensity distribution being different from the first intensity distribution; and a depth calculation unit operable to calculate a depth-direction distance to the subject based on outgoing light beams from the subject.

7 Claims, 27 Drawing Sheets

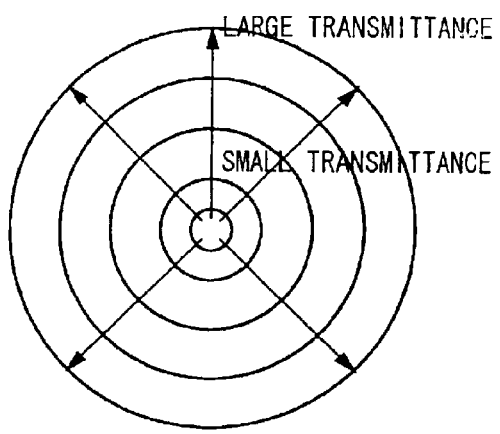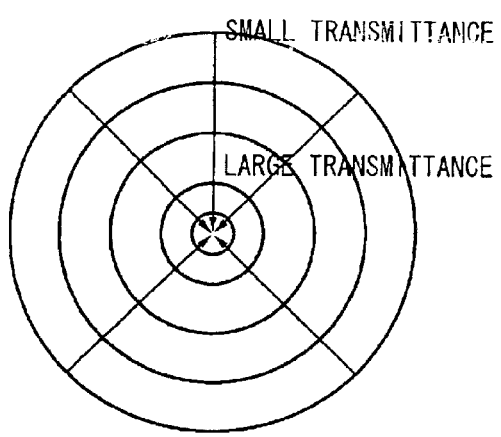
FIG. 5C
FIG. 5D

IMAGE CAPTURING APPARATUS AND DISTANCE MEASURING METHOD

This patent application is a divisional application of U.S. application Ser. No. 09/878,398 now U.S. Pat. No. 6,724,490, which was filed Jun. 12, 2001, which also claims priority based on a Japanese patent application No. 2000-176142 filed on Jun. 12, 2000, the contents of which are incorporated herein by reference.

BACKGROUND OF THE INVENTION

1. Field of the Invention

The present invention relates to an image capturing apparatus and a distance measuring method for obtaining information regarding a depth-direction distance to a subject. More particularly, the present invention relates to an image capturing apparatus and a distance measuring method for obtaining the information regarding a depth of the subject by capturing outgoing light beams from the subject that is illuminated with light.

2. Description of the Related Art

As a method for obtaining information regarding a distance to an object or information regarding a position of the object, a three-dimensional image measuring method is known in which light having a pattern of, for example, a slit or a stripe, is cast onto the object and the pattern cast onto the object is captured and analyzed. There are a slit-light projection method (light cutting method) and a coded-pattern light projection method as typical measuring methods, which are described in detail in "Three-dimensional image measurement" by Seiji Inokuchi and Kosuke Sato (Shokodo Co., Ltd.).

Japanese Patent Application Laying-Open No. 61-155909 (published on Jul. 15, 1986) and Japanese Patent Application Laying-Open No. 63-233312 (published on Sep. 29, 1988) disclose a distance measuring apparatus and a distance measuring method in which light beams are cast onto a subject from different light-source positions and the distance to the subject is measured based on the intensity ratio of the reflected light beams from the subject.

Japanese Patent Application Laying-Open No. 62-46207 (published on Feb. 28, 1987) discloses a distance detecting apparatus that casts two light beams having different phases onto the subject and measures the distance to the subject based on the phase difference between the light beams reflected from the subject.

Moreover, "Development of Axi-Vision Camera", Kawakita et al., 3D Image conference '99, 1999, discloses a method for measuring the distance to the subject in which the subject that is illuminated with light having the intensity modulated at a very high speed is captured by a camera having a high-speed shutter function, and the distance to the subject is measured from the degree of the intensity modulation that varies depending on the distance to the subject.

Japanese Patent Application Laying-Open Nos. 10-48336 and 11-94520 disclose an actual time-range finder that calculates the distance to the subject by casting different light patterns having different wavelength characteristics onto the subject and extracting wavelength components of light reflected from the subject incident light.

In the conventional distance measuring apparatus and method, the time difference occurs in the measurement because it is necessary to successively cast the light from the different emission positions so as to measure the reflected light beams, as disclosed in Japanese Patent Applications Laying-Open Nos. 61-155909 and 63-233312. Thus, in a case of the moving subject, the distance cannot be measured. In addition, during a time period in which the position of the light source is changed to change the emission position, the measurement error may occur because of waver of the capturing apparatus.

Moreover, in a case of using light beams having different wavelength characteristics, the light beams can be emitted simultaneously, and the reflected light beams can be separated by a filter prepared in accordance with the wavelength characteristics of the light beams, so that the intensities of the reflected light beams can be measured. However, if the spectral reflectance of the subject varies depending on the wavelength, the intensities of the reflected light beams are also different depending on the wavelength thereof. The difference of the reflected-light intensities between the wavelengths may cause an error when the depth-direction distance is calculated from the ratio of the intensities of the reflected light beams, thereby preventing the precise calculation of the depth-direction distance.

The actual time-range finder disclosed in Japanese Patent Applications Laying-Open Nos. 10-48336 and 11-94520 also uses the light having different wavelength characteristics for calculating the distance to the subject. In a case where spectral reflectance is varied depending on a position of the illuminated portion of the subject, however, the error may be caused, thus preventing the precise calculation of the depth-direction distance.

The distance measuring apparatus disclosed in Japanese Patent Application Laying-Open No. 62-46207 requires a high-precision phase detector for detecting the phase difference. This makes the apparatus expensive and loses the simplicity of the apparatus. In addition, since this apparatus measures the phase of the reflected light beam from a point of the subject, it cannot measure the depth distribution of the whole subject.

Moreover, in the distance measuring method using the intensity modulation disclosed in "Development Axi-Vision Camera" by Kawakita et al. (3D Image Conference '99, 1999), it is necessary to perform the light modulation at a very high speed in order to realize the intensity-modulation. Thus, a simple measurement cannot be realized. In addition, the measurement may include the time difference, thus preventing a precise measurement for the moving subject.

SUMMARY OF THE INVENTION

Therefore, it is an object of the present invention to provide an image capturing apparatus and a distance measuring method that overcome the above issues in the related art. This object is achieved by combinations described in the independent claims. The dependent claims define further advantageous and exemplary combinations of the present invention.

According to the first aspect of the present invention, an image capturing apparatus for obtaining information regarding a depth of a subject, comprises: an illumination unit operable to cast a first illumination light beam mainly containing a first wavelength and having a first intensity distribution on a plane perpendicular to an optical axis of the first illumination light beam and a second illumination light beam mainly containing a second wavelength and a third wavelength and having a second intensity distribution on a plane perpendicular to an optical axis of the second illumination light beam onto the subject, the second and third wavelengths being different from the first wavelength, the second intensity distribution being different from the first intensity distribution; and a depth calculation unit operable to calculate a depth-direction distance to the subject based on outgoing light beams from the subject.

The first illumination light beam may have an intensity that monotonously increases along a first direction on the plane perpendicular to the optical axis thereof, and the second illumination light beam may have an intensity that monotonously decreases along a second direction on the plane perpendicular to the optical axis thereof, the second direction being opposite to the first direction.

The first illumination light beam may have the first intensity distribution in which, with increase of a distance from the optical axis thereof on the plane perpendicular to the optical axis, an intensity monotonously increases or decreases, and the second illumination light may have the second intensity distribution in which, with increase of a distance from the optical axis thereof on the plane perpendicular to the optical axis, an intensity monotonously decreases when the first illumination light increases or increases when the first illumination light decreases.

The illumination unit may cast the first and second illumination light beams onto the subject simultaneously.

The image capturing apparatus may further comprise: an optically converging unit operable to converge the outgoing light beams from the subject onto which the first and second illumination light beams are cast; a separation unit operable to optically separate the outgoing light beams into a first outgoing light beam having the first wavelength, a second outgoing light beam having the second wavelength, and a third outgoing light beam having the third wavelength; a light-receiving unit operable to receive the first, second and third outgoing light beams after being are separated by the separation unit and converged by the optically converging unit; and a light intensity detector operable to detect intensities of the first, second and third outgoing light beams received by the light-receiving unit, wherein the depth calculation unit calculates the depth-direction distance to the subject by using the intensities of the first, second and third outgoing light beams.

The first illumination light beam may have an intensity that increases on the plane perpendicular to the optical axis thereof along a first direction parallel to a line obtained by projecting a line connecting the illumination unit to the light-receiving unit or the optical converging unit on the plane perpendicular to the optical axis thereof, and the second illumination light beam may have an intensity that increases on the plane perpendicular to the optical axis thereof along a second direction opposite to the first direction.

The illumination unit may include a first illumination optical filter operable to transmit light having the first wavelength and a second illumination optical filter operable to transmit light having the second and third wavelengths. In this case, the first and second illumination optical filters are arranged in such a manner that the first and second illumination light beams are incident on the first and second illumination optical filters, respectively.

The first illumination optical filter may have a transmittance that increases along a first direction on an incident surface thereof, while the second illumination optical filter have a transmittance that increases along a second direction on an incident surface thereof, the second direction being opposite to the first direction.

The first illumination optical filter may have a transmittance that increases or decreases with increase of a distance from the optical axis of the first illumination light beam on the incident surface thereof, while the second illumination optical filter has a transmittance that, with increase of a distance from the optical axis of the second illumination light beam on the incident surface, decreases in a case where the transmittance of the first illumination optical filter increases with the increase of the distance from the optical axis of the first illumination light beam or increases in a case where the transmittance of the first illumination optical filter decreases with the increase of the distance from the optical axis of the first illumination light beam.

The separation unit may include a first outgoing optical filter operable to transmit light having the first wavelength, a second outgoing optical filter operable to transmit light having the second wavelength, and a third outgoing optical filter operable to transmit light having the third wavelength. In this case, the first, second and third outgoing optical filters are arranged in such a manner that the first, second and third outgoing light beams are incident on the first, second and third outgoing optical filters, respectively.

The separation unit may include a first outgoing optical filter operable to transmit light having the first wavelength and a second outgoing optical filter operable to transmit light having the second and third wavelengths. In this case, the first and second outgoing optical filters are arranged in such a manner that the first outgoing light beam is incident on the first outgoing optical filter while the second and third outgoing light beams are incident on the second outgoing optical filter.

The light-receiving unit may include a solid state image sensor, and the separation unit may include a first outgoing optical filter that transmits light having the first wavelength, a second outgoing optical filter that transmits light having the second wavelength and a third outgoing optical filter that transmits light having the third wavelength, the first, second and third outgoing optical filters being arranged alternately on a light-receiving surface of the solid state image sensor.

The depth calculation unit may calculate the depth-direction distance to the subject by using a value based on the intensities of the second and third outgoing light beams and the intensity of the first outgoing light beam.

The depth calculation unit may calculate the depth-direction distance to the subject by using an averaged intensity of the intensities of the second and third outgoing light beams, and the intensity of the first outgoing light beam.

The second wavelength may be shorter than the first wavelength while the third wavelength is longer than the first wavelength. In this case, the image capturing apparatus may further comprise: an optically converging unit operable to converge the outgoing light beams from the subject onto which the first and second illumination light beams are cast; a separation unit operable to optically separate the outgoing light beams into a first outgoing light beam having the first wavelength and a second outgoing light beam having the second and third wavelengths; a light-receiving unit operable to receive the first and second outgoing light beams after being separated by the separation unit and converged by the optically converging unit; and a light intensity detector operable to detect intensities of the first and second outgoing light beams received by the light-receiving unit, wherein the depth calculation unit calculates the depth-direction distance to the subject by using the intensities of the first and second outgoing light beams.

The depth calculation unit may calculate the depth-direction distance to the subject by using the intensity of the first outgoing light beam and a half of the intensity of the second outgoing light beam.

The light intensity detector may calculate the intensities of the first and second outgoing light beams for each pixel of an image of the subject taken by the light-receiving unit. In this case, the depth calculation unit calculates a depth distribution of the subject by obtaining the depth-direction distance to a region of the subject corresponding to every pixel.

The first and second illumination light beams may be light beams in an infrared region, and the separation unit may further include a device operable to optically separate visible light from the outgoing light beams from the subject. In this case, the light-receiving unit may further include a solid state image sensor for visible light operable to receive the visible light that is optically separated by the separation unit and is converged by the optically converging unit, and the image capturing apparatus may further comprise a recording unit operable to record both the depth distribution of the subject calculated by the depth calculation unit and the image of the subject taken by the solid-state image sensor for visible light.

According to a second aspect of the present invention, a distance measuring method for obtaining information regarding a depth of a subject, comprises: an illumination step for simultaneously casting a first illumination light beam mainly containing a first wavelength and having a first intensity distribution on a plane perpendicular to an optical axis thereof and a second illumination light beam mainly containing a second wavelength and a third wavelength and having a second intensity distribution on a plane perpendicular to an optical axis thereof onto the subject, the second and third wavelengths being different from the first wavelength, the second intensity distribution being different from the first intensity distribution; a separation step for optically separating outgoing light beams from the subject onto which the first and second illumination light beams are cast into a first outgoing light beam having the first wavelength, a second outgoing light beam having the second wavelength, and a third outgoing light beam having the third wavelength; a capturing step for capturing the first, second and third outgoing light beams; a light intensity detection step for detecting the intensities of the captured first, second and third outgoing light beams; and a depth calculation step for calculating a depth-direction distance to the subject based on the intensities of the first, second and third outgoing light beams.

The depth-direction distance to the subject may be calculated based on a value based on the intensities of the second and third outgoing light beams and the intensity of the first outgoing light beam in the depth calculation step.

The depth-direction distance to the subject may be calculated based on an averaged intensity of the intensities of the second and third outgoing light beams and the intensity of the first outgoing light beam in the depth calculation step.

According to a third aspect of the present invention, a distance measuring method for obtaining information regarding a depth of a subject, comprises: an illumination step for simultaneously casting a first illumination light beam mainly containing a first wavelength and having a first intensity distribution on a plane perpendicular to an optical axis of the first illumination light beam and a second illumination light beam mainly containing a second wavelength and a third wavelength and having a second intensity distribution on a plane perpendicular to an optical axis of the second illumination light beam onto the subject, the second wavelength being shorter than the first wavelength, the third wavelength being longer than the first wavelength, the second intensity distribution being different from the first intensity distribution; a separation step for optically separating the outgoing light beams into a first outgoing light beam having the first wavelength and a second outgoing light beam having the second and third wavelengths; a capturing step for capturing the first and second outgoing light beams; a light intensity detection step for detecting the intensities of the first and second outgoing light beams; and a depth calculation step for calculating a depth-direction distance to the subject based on the intensities of the first and second outgoing light beams.

The depth-direction distance to the subject may be calculated based on the intensity of the first outgoing light beam and a half of the intensity of the second outgoing light beam in the depth calculation step.

According to a fourth aspect of the present invention, an image capturing apparatus for obtaining information regarding a depth of a subject, comprises: an illumination unit operable to cast a first illumination light beam mainly containing a first wavelength and a second illumination light beam mainly containing a second wavelength and a third wavelength, the first and second illumination light beams being modulated in such a manner that the intensities of the first and second illumination light beams are changed along the respective traveling directions, the second and third wavelengths being different from the first wavelength; and a depth calculation unit operable to calculate a depth-direction distance to the subject based on outgoing light beams from the subject onto which the first and second illumination light beams are cast.

The first illumination light beam may be modulated in such a manner that the intensity thereof monotonously increases or decreases along the traveling direction thereof, and the second illumination light beam may be modulated in such a manner that the intensity thereof monotonously decreases along the traveling direction of the second illumination light beam when the intensity of the first illumination light beam monotonously increases along the traveling direction of the first illumination light beam, or increases along the traveling direction of the second illumination light beam when the intensity of the first illumination light beam monotonously decreases along the traveling direction of the first illumination light beam.

The image capturing apparatus may further comprise a modulation unit operable to change the intensities of the first and second illumination light beams by temporal modulation.

The second wavelength may be shorter than the first wavelength while the third wavelength is longer than the first wavelength, and the image capturing apparatus may further comprise: an optically converging unit operable to converge the outgoing light beams from the subject onto which the first and second illumination light beams are cast; a separation unit operable to optically separate the outgoing light beams into a first outgoing light beam having the first wavelength and a second outgoing light beam having the second and third wavelengths; a light-receiving unit operable to receive the first and second outgoing light beams after being separated by the separation unit and converged by the optically converging unit; and a light intensity detector operable to detect intensities of the first and second outgoing light beams received by the light-receiving unit, wherein the depth calculation unit calculates the depth-direction distance to the subject by using the intensities of the first and second outgoing light beams.

According to a fifth aspect of the present invention, a distance measuring method for obtaining information regarding a depth of a subject, comprises: an illumination step for simultaneously casting a first illumination light beam mainly containing a first wavelength and a second illumination light beam mainly containing a second wavelength and a third wavelength, the first and second illumination light beams being modulated in such a manner that the intensities of the first and second illumination light beams are changed along traveling directions thereof, respectively; a separation step for optically separating the outgoing light beams from the subject into a first outgoing light beam having the first wavelength, a second outgoing light beam having the second wavelength, and a third outgoing light beam having the third wavelength; a capturing step for capturing the first, second and third outgoing light beams; a light intensity detection step for detecting the intensities of the first, second and third outgoing light beams; and a depth calculation step for calculating a depth-direction distance to the subject based on the intensities of the first, second and third outgoing light beams.

The depth-direction distance to the subject may be calculated based on the intensity of the first outgoing light beam and a value based on the intensities of the second and third outgoing light beams in the depth calculation step.

According to a sixth aspect of the present invention, a distance measuring method for obtaining information regarding a depth of a subject, comprises: an illumination step for simultaneously casting a first illumination light beam mainly containing a first wavelength and a second illumination light beam mainly containing a second wavelength and a third wavelength, the first and second illumination light beams being modulated in such a manner that the intensities of the first and second illumination light beams are changed along traveling directions thereof, respectively, the second wavelength being shorter than the first wavelength, the third wavelength being longer than the first wavelength; a separation step for optically separating the outgoing light beams into a first outgoing light beam having the first wavelength and a second outgoing light beam having the second and third wavelengths; a capturing step for capturing the first and second outgoing light beams; a light intensity detection step for detecting the intensities of the first and second outgoing light beams; and a depth calculation step for calculating a depth-direction distance to the subject based on the intensities of the first and second outgoing light beams.

This summary of the invention does not necessarily describe all necessary features of the present invention. The present invention may also be a sub-combination of the above described features. The above and other features and advantages of the present invention will become more apparent from the following description of embodiments taken in conjunction with the accompanying drawings.

BRIEF DESCRIPTION OF THE DRAWINGS

FIGS. 5A, 5B, 5C and 5D explain an optical filter 42 provided in an illumination unit 40.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

(Embodiment 1)

Figure 1:
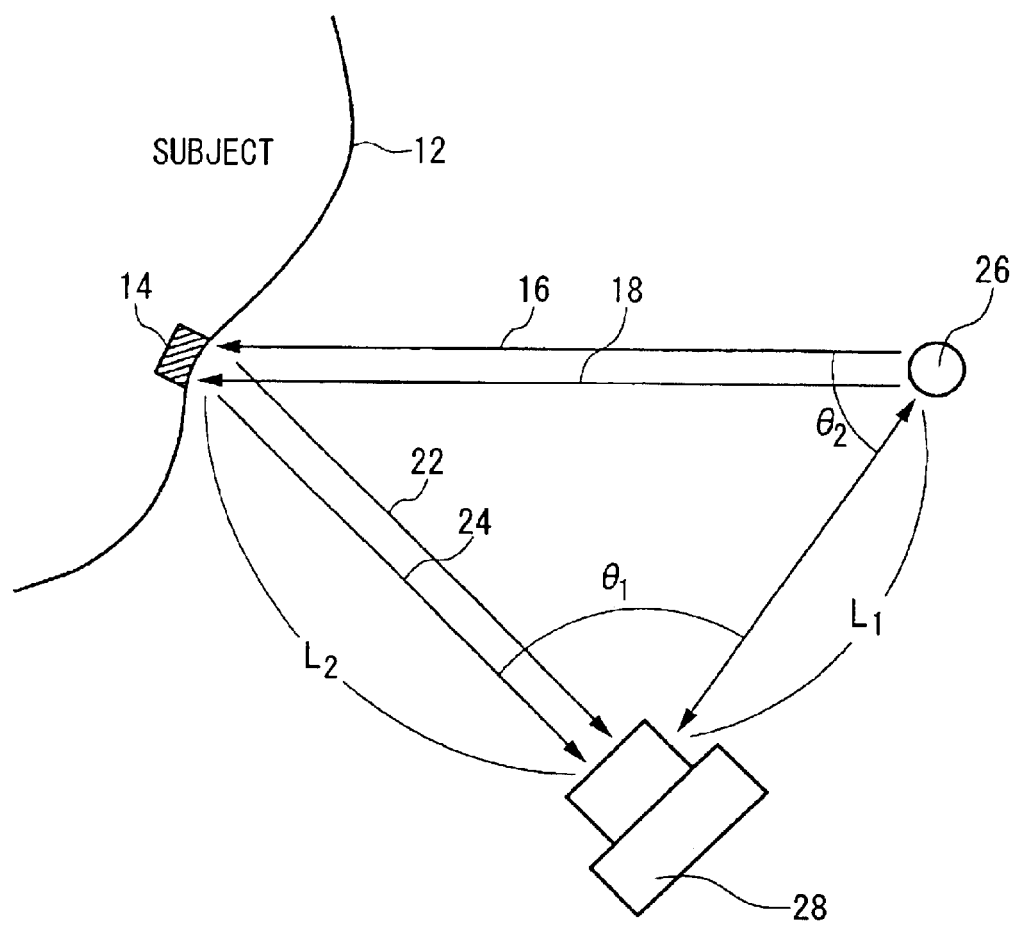
FIG. 1 is a diagram for explaining a basic principle of the first embodiment of the present invention.

FIG. 1 is a diagram for explanation of the principle of the first embodiment of the present invention. A light source 26 emits a first illumination light beam 16 and a second illumination light beam 18. The first and second illumination light beams 16 and 18 have the first and second intensity distributions on planes perpendicular to optical axes thereof, respectively. When the light source 26 casts the first illumination light beam 16 onto the subject 12, a camera 28 captures a first reflected light beam 22 from an illuminated portion 14 that is illuminated with the first illumination light beam 16. Then, when the light source 26 casts the second illumination light beam 18 onto the subject 12, the camera 28 captures a second reflected light beam 24 from the illuminated portion 14 that is illuminated with the second illumination light beam 18. The camera 28 may be a charge-coupled device (CCD) image sensor, for example, and captures the first and second reflected light beams 22 and 24 from the illuminated portion 14 of the subject 12 for every pixel so as to detect the intensity of the first and second reflected light beam 22 and 24 for every pixel. The camera 28 is arranged at a position apart from the light source 26 by a predetermined distance L1.

Figure 2A:
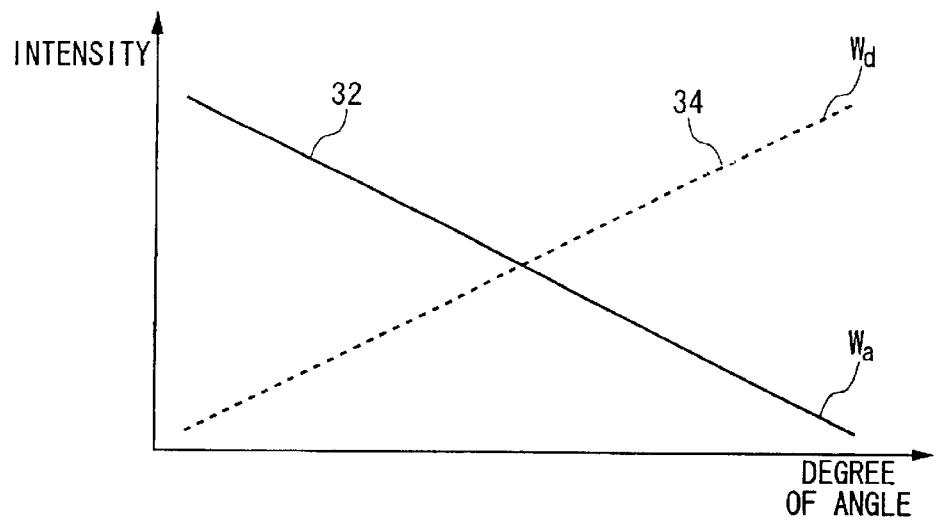
FIGS. 2A and 2B are diagrams for explaining intensity distributions of illumination light.
Figure 2B:
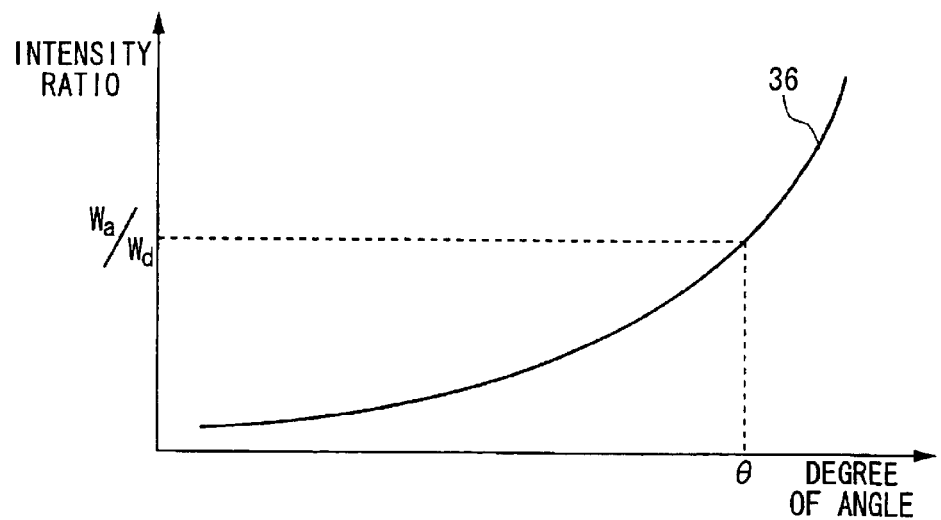

FIG. 2A illustrates exemplary distributions of the intensities Wa and Wd on the planes perpendicular to the optical axes of the first and second illumination light beams 16 and 18, respectively. More specifically, FIG. 2A shows the distributions of the intensities Wa and Wd on the planes perpendicular to the optical axes of the first and second illumination light beams 16 and 18, respectively. The vertical axis represents the intensity while the horizontal axis represents the degree of an angle formed by a line connecting the light source 26 to the camera 28 shown in FIG. 1 and the respective illumination light beam having the corresponding intensity represented by the horizontal axis. In this example, the intensity Wa of the first illumination light beam 16 monotonously increases in the first direction on the plane perpendicular to the optical axis of the first illumination light beam 16, while the intensity Wd of the second illumination light beam 18 monotonously increases in a direction opposite to the first direction on the plane perpendicular to the optical axis of the second illumination light beam 18. FIG. 2B shows the intensity ratio of Wa to Wd.

In a case where the first and second illumination light beams 16 and 18 have the intensity distributions as shown in FIG. 2A, an illumination angle 82 (FIG. 1) of a direction along which the first and second illumination light beams 16 and 18 travel with respect to the line connecting the light source 26 and the camera 28 is calculated based on the intensity ratio Wa/Wd detected at each pixel of the camera 28, as shown in FIG. 2B. Also, an incident angle θ1 (FIG. 1) of the first and second reflected light beams 22 and 24 with respect to the line connecting the light source 26 and the camera 28 is calculated from the position of the pixel at which the intensity ratio Wa/Wd is detected. Thus, from the incident angle θ1, the illumination angle θ2, and a distance L1 between the light source 26 and the camera 28, a depth-direction distance to the illuminated portion 14 of the subject 12 can be calculated by triangulation.

In the above-mentioned method, however, since the first and second light beams 16 and 18 are cast one by one and the camera 28 receives the light beams reflected from the subject 12, time difference occurs in the image capturing. Thus, the above-mentioned method cannot be applied to a case of the moving subject. In order to overcome this problem, a method is considered in which the first and second illumination light beams 16 and 18 are provided with different wavelength characteristics and are emitted simultaneously. In this method, the first and second reflected light beams 22 and 24 are separated from each other by wavelength and then the intensity of each reflected light beam is measured.

In general, the surface reflectance of the illuminated portion of the subject varies depending on the wavelength of the light beam that is cast onto the illuminated portion. Thus, even if the reflected-light intensity ratio Wa/Wd has been obtained, the depth-direction distance of the subject cannot be calculated. Although the reflected-light intensity ratio Wa/Wd and the depth-direction distance to the illuminated portion 14 of the subject 12 can be obtained while the difference between the wavelength λ1 of the first illumination light beam 16 and the wavelength λ2 of the second illumination light beam 18 is made very small and the difference of the surface reflectance between wavelengths is ignored, the calculation result includes an error. In order to reduce such a calculation error, the difference between the wavelengths λ1 and λ2 has to be made sufficiently small. However, when the difference between the wavelengths λ1 and λ2 is made small, the precision in the wavelength separation is also reduced, so that the intensity measurement for the respective wavelengths may include an error.

Therefore, the design of the apparatus is in dilemma as to whether to make the difference between the wavelengths λ1 and λ2 larger in order to improve the resolution of the wavelength separation thereby improving the precision of the intensity measurement or to make the difference between the wavelengths λ1 and λ2 smaller in order to reduce the difference of the surface reflectance between wavelenths thereby improving the precision of the distance measurement. Thus, there is a limitation in improvement of the precision of the distance measurement.

Accordingly, in the present embodiment, the depth-direction distance to the subject can be obtained in the following manner. The first illumination light beam having the first wavelength component as a main component and the first intensity distribution on a plane perpendicular to an optical axis of the first illumination light beam and the second illumination light beam having the second and third wavelength components as main components and the second intensity distribution on a plane perpendicular to an optical axis of the second illumination light beam are cast onto the subject simultaneously, the second and third wavelength components being different from the first wavelength component and the second intensity distribution being different from the first intensity distribution. Then, the first and second reflected light beams respectively generated by reflection of the first and second illumination light beams by the subject are optically separated, and thereafter a dummy reflected-light intensity is calculated from the second reflected light beam. The dummy reflected-light intensity is the intensity of a dummy reflected light beam expected to be obtained from the subject in a case where it is assumed that light having the second intensity distribution mainly contains the first wavelength. Based on a ratio of the dummy reflected-light intensity and the intensity of the first reflected light beam, and the distance L1 between the light source 26 and the camera 28, the depth-direction distance to the illuminated portion 14 of the subject 12 is calculated. In this method, the difference of the surface reflectance between the wavelengths can be cancelled by obtaining the dummy reflected-light intensity. Thus, the depth of the subject or the distance to the subject can be precisely obtained.

Figure 3:
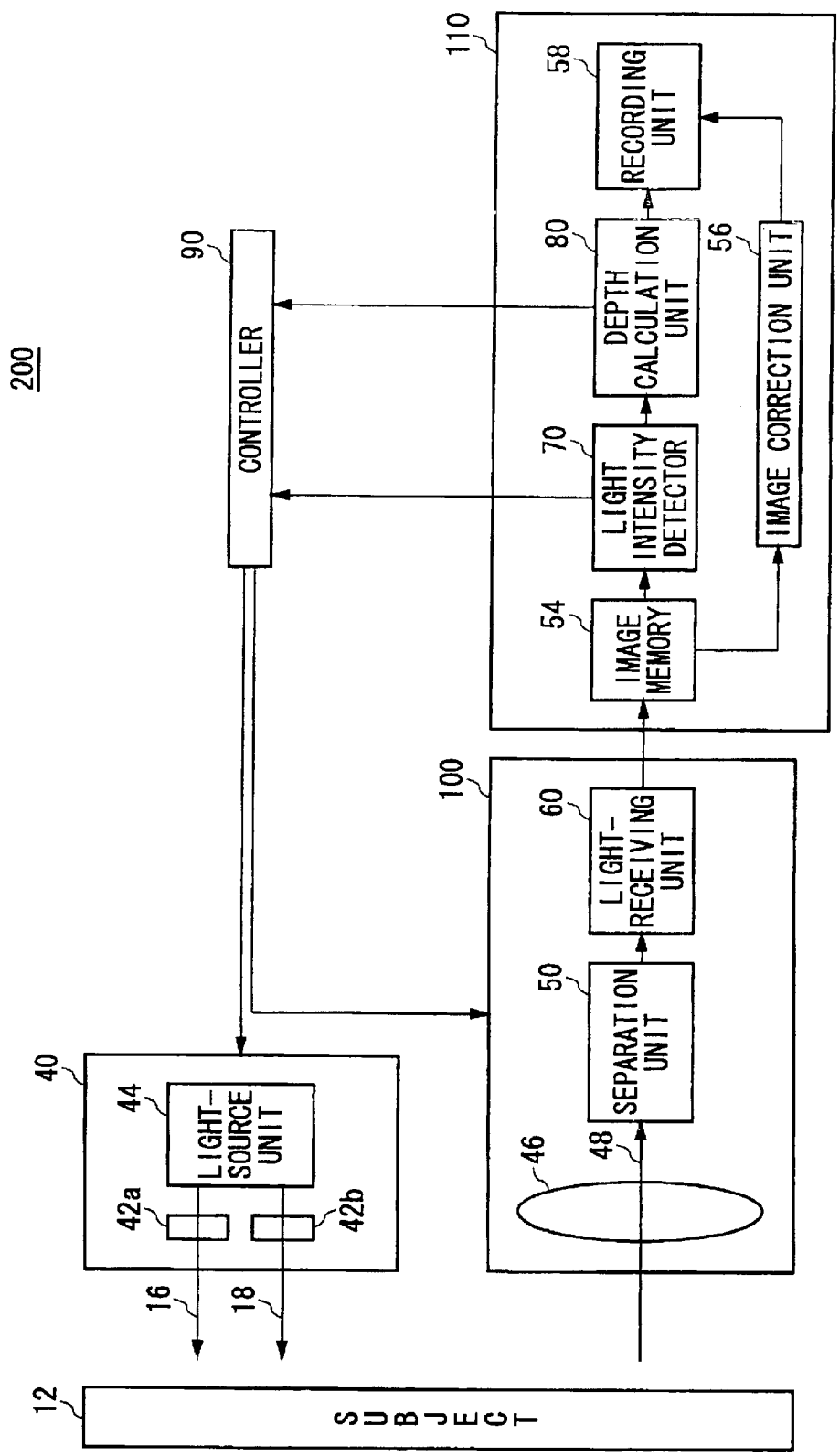
FIG. 3 shows a structure of an image capturing apparatus according to the first embodiment of the present invention.

FIG. 3 schematically shows a structure of an image capturing apparatus 200 according to the first embodiment of the present embodiment. The image capturing apparatus 200 includes an illumination unit 40, a capturing unit 100, a controller 90 and a processing unit 110.

The illumination unit 40 casts light onto the subject 12. The capturing unit 100 captures an image of the subject 12 that is illuminated with the light from the illumination unit 40. The processing unit 110 processes the image of the subject 12 taken by the capturing unit 100 to obtain the depth of or the distance to the captured subject 12, so that the obtained depth or distance is recorded as information regarding a depth distribution of the subject 12. The processing unit 110 can also record the image of the subject 12 taken by the capturing unit 100. The controller 90 perform a feedback control based on the depth-direction distance to the subject 12 obtained by the processing unit 110 so as to control at least one of the intensity, an emission time, a duration of the emission and an emission position of the light emitted from the illumination unit 40, an exposure period of the capturing unit 100 and the like.

The illumination unit 40 includes a light-source unit 44 and optical filters 42a and 42b. The light beams emitted from the light-source unit 44 pass through the optical filters 42a, 42b so as to be incident on the subject 12 as the first and second illumination light beams 16 and 18. The optical filer 42a allows light having the first wavelength λ1 to pass therethrough, while the optical filter 42b allows light having the second wavelength λ2 and the third wavelength λ3 to pass therethrough. The first illumination light beam 16 has the first intensity distribution on the plane perpendicular to the optical axis of the first illumination light beam 16, while the second illumination light beam 18 has the second intensity distribution different from the first intensity distribution on the plane perpendicular to the optical axis of the second illumination light beam 18. The first and second intensity distributions are determined by transmittance distributions of the optical filters 42a and 42b described later, the transmittance distributions of the optical filters 42a and 42b being different from each other.

In order to efficiently use the light amount, the illumination unit 40 may include an optical lens, such as a condenser lens, inserted on optical paths of the illumination light beams for converging the light beams.

The capturing unit 100 includes an optical lens 46 as an optical converging unit, a separation unit 50 and a light-receiving unit 60. The optical lens 46 converges the reflected light 48 from the subject 12. The separation unit 50 separates the reflected light 48 from the subject 12 into wavelength components in accordance with the wavelength characteristics of the light beams emitted from the illumination unit 40. The light-receiving unit 60 receives the reflected light beams after being converged by the optical lens 46 and separated by the separation unit 50.

The light-receiving unit 60 is a solid-state image sensor, for example. The image of the subject is formed on a light-receiving surface of the solid state image sensor. In accordance with the light amount of the formed image of the subject, respective sensor elements of the solid state image sensor are electrically charged. The stored charges are scanned in a predetermined order, so that the charges are read as an electric signal.

It is desirable that the solid state image sensor be a charge-coupled device (CCD) image sensor having an excellent S/N ratio and a large number of pixels so as to allow the intensity of the reflected light from the subject to be detected with high precision for each pixel. As the solid state image sensor, any of an MOS image sensor, a CdS-Se contact image sensor, an a-Si (amorphous silicon) contact image sensor, and a bipolar contact image sensor may be used other than the CCD image sensor.

The processing unit 110 includes an image memory 54, a light intensity detector 70, a depth calculation unit 80, an image correction unit 56 and a recording unit 58. The image memory 54 stores the image of the subject 12 taken by the capturing unit 100 in accordance with the wavelength characteristics of the illumination light emitted from the illumination unit 40. The light intensity detector 70 detects the intensity of the reflected light from the image of the subject 12 stored in the image memory 54 for each pixel or pixel area. The depth calculation unit 80 calculates the depth-direction distance to the subject 12 that is captured in each pixel area based on the reflected-light intensity detected by the light intensity detector 70. The recording unit 58 records the distribution of the depth of the subject 12 calculated by the depth calculation unit 80. The image correction unit 56 conducts correction such as gray-scale correction or correction of white balance for the image of the subject 12 stored in the image memory 54. The recording unit 58 records the image of the subject 12 processed by the image correction unit 56. Moreover, the light intensity detector 70 and the depth calculation unit 80 output the detected level of the reflected light from the subject 12 and the information of the depth distribution of the subject 12 to the controller 90, respectively. The recording unit 58 records image data and the depth-distribution information onto a semiconductor memory such as a flash memory or a memory card.

The controller 90 conducts a feed-back control based on the depth-direction distance to the subject 12 obtained by the processing unit 110 so as to control the intensity of the illumination light emitted by the illumination unit 40, the emission time, the sensitivity or an exposure time period of the light-receiving unit 40 of the capturing unit 120, or the like. The controller 90 may control the illumination unit 40 and the capturing unit 100 by using luminance data from a luminance sensor (not shown) and/or distance data from a distance sensor (not shown). Also, the controller 90 may adjust a focal length, an aperture size, the exposure time period or the like when the image of the subject 12 is to be captured, based on the depth-direction distance to the subject 12 obtained by the processing unit 110.

Figure 4:
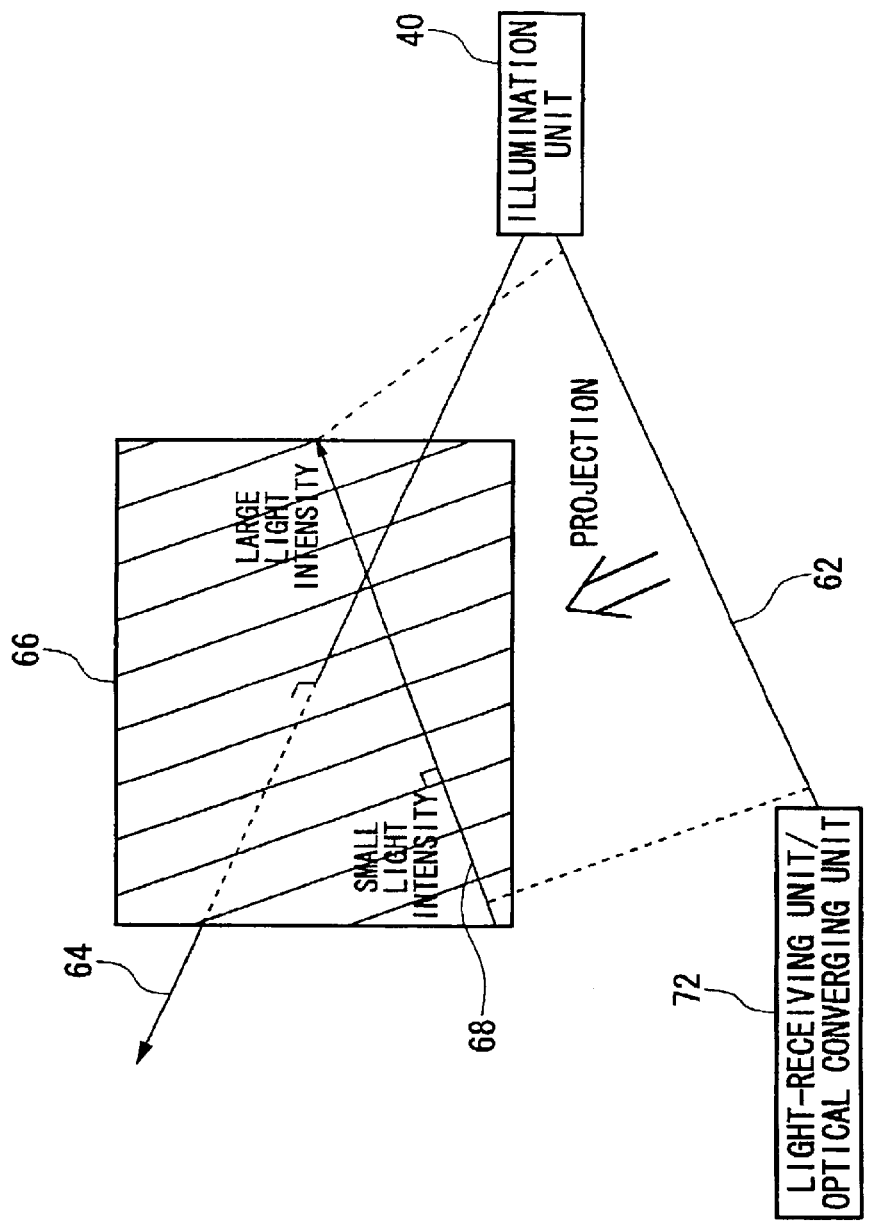
FIG. 4 is a diagram for explaining an exemplary intensity distribution of the illumination light.

FIG. 4 is a diagram for explaining an exemplary intensity distribution of the light emitted from the illumination unit 40. A plane 66 is perpendicular to an optical axis 64 of the light emitted from the illumination unit 40. On the plane 66, the light emitted from the illumination unit 40 monotonously increases or decreases in a direction shown by a line 68 in FIG. 4. The line 68 is parallel to a line obtained by projecting a line 62 connecting the illumination unit 40 and the light-receiving unit or optical converging unit 72 onto the plane 66. In the present embodiment, the depth of the subject or the distance to the subject is calculated by triangulation based on the distance between the illumination unit 40 and the capturing unit (the light receiving unit or the optical converging unit), the illumination angle of the light emitted from the illumination unit, and the incident angle of the reflected light. Thus, it is preferable that the first and second illumination light beams emitted from the illumination unit 40 have the intensity distributions described with reference to FIG. 4. In an alternative example, the first illumination light may have the intensity distribution that monotonously increases or decreases with the increase of the distance from the optical axis of the first illumination light beam on the plane perpendicular to the optical axis. In this case, the second illumination light beam may have the intensity distribution in which the intensity monotonously decreases with the increase of the distance from the optical axis of the second illumination light beam on the plane perpendicular to the optical axis in a case where the intensity of the first illumination light beam monotonously increases with the increase of the distance from the optical axis of the first illumination light beam, or monotonously increases with the increase of the distance from the optical axis of the second illumination light beam in a case where the intensity of the first illumination light beam monotonously decreases with the increase of the distance from the optical axis of the first illumination light beam. In another alternative example, the first and second illumination light beams may have intensity distributions other than those described above.

Figure 5A:
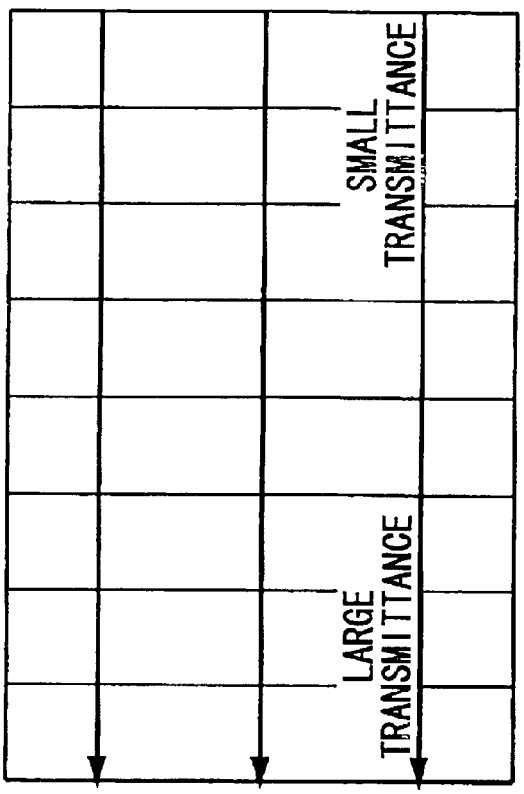
Figure 5B:
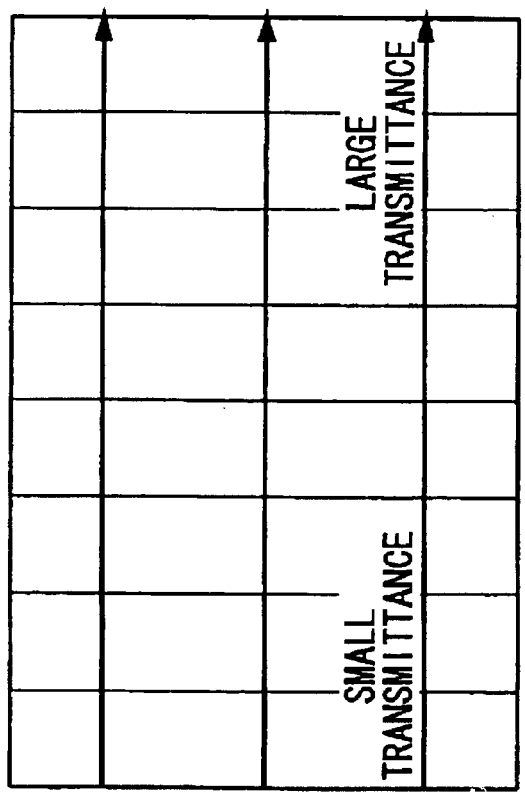

FIGS. 5A, 5B, 5C and 5D are diagrams for explaining examples of the optical filter 42 in the present embodiment. FIGS. 5A and 5B are diagrams for explaining the optical filter 42 having the transmittance varying along a single direction. As described above with reference to FIG. 3, the illumination unit includes two optical filters 42 having different transmittance distributions. One of the optical filters 42 has the transmittance distribution in which the transmittance monotonously increases along a certain direction, as shown in FIG. 5A, while the other has the transmittance distribution in which the transmittance monotonously increases along a direction opposite to the certain direction, as shown in FIG. 5B. Alternatively, one of the optical filters 42 may have such a transmittance distribution that the transmittance monotonously increases with the increase of the distance from the center of the optical filter while the other may have such a transmittance distribution that the transmittance monotonously decreases with the increase of the distance from the center of the optical filter. Moreover, an optical filer having another transmittance distribution may be used. In addition, it is preferable that the optical filters 42 allow different wavelength components to mainly pass therethrough, respectively.

In a case of using the optical filter 42 described with reference to FIGS. 5C and 5D, it is possible to perform distance calculation in all directions. In this case, however, an error occurs in directions other than the direction parallel to the line connecting the illumination unit 40 and the capturing unit 100, since the distance calculation uses triangulation. Thus, it is preferable in the present embodiment to use the optical filter 42 described with reference to FIGS. 5A and 5B.

Figure 6:
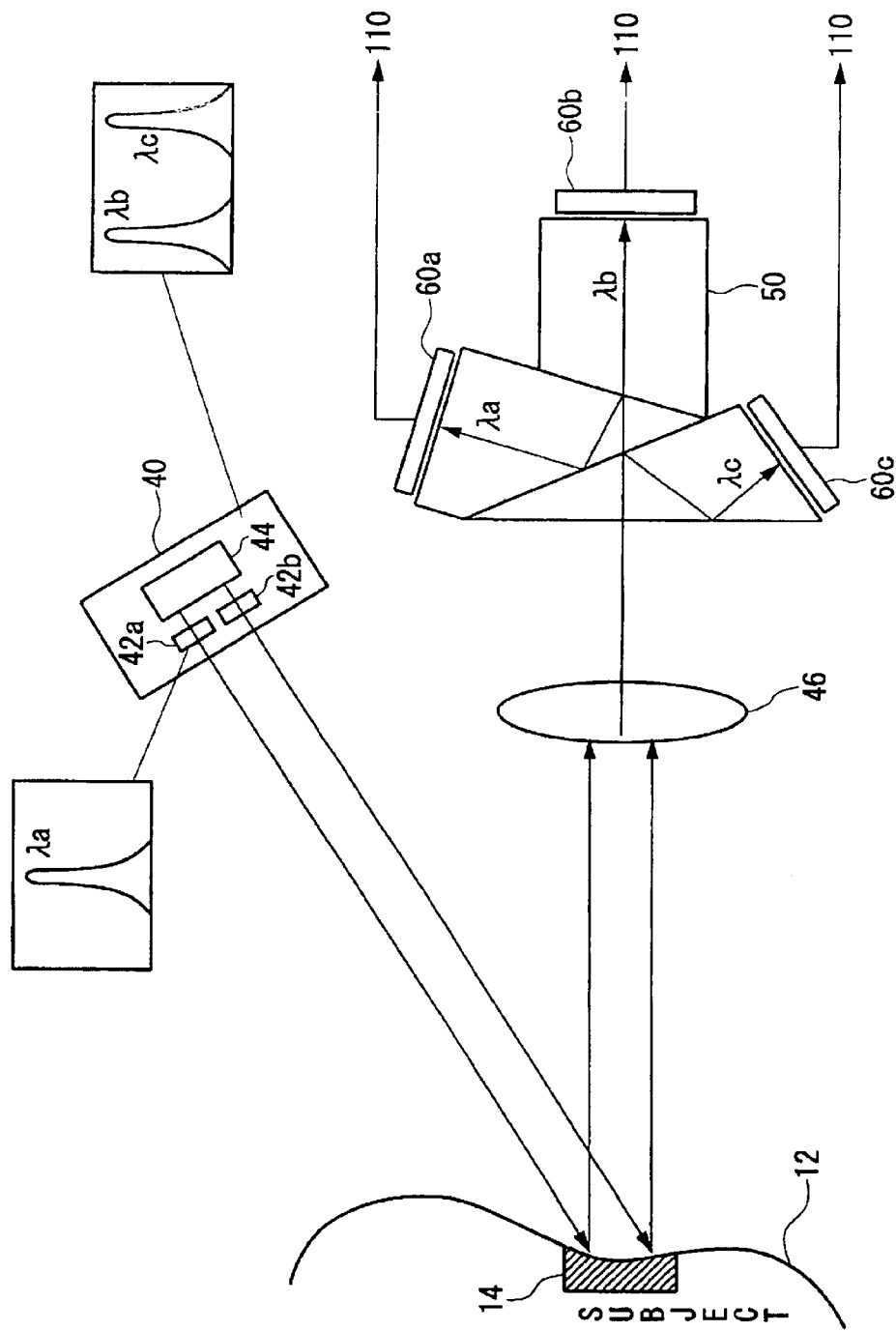
FIG. 6 shows an exemplary arrangement of the illumination unit 40 and a capturing unit 100 according to the first embodiment of the present invention.

FIG. 6 shows an exemplary arrangement of the illumination unit 40 and the capturing unit 100 in the present embodiment. The illumination unit 40 includes the light-source unit 44 and the optical filters 42a and 42b. The optical filter 42a mainly transmits light having a wavelength $\lambda a$ while the optical filter 42b mainly transmits light having wavelengths $\lambda b$ and $\lambda c$. The illumination unit 40 casts the light emitted from the light-source unit 44 onto the subject 12 via the optical filters 42a and 42b as the light having the wavelength $\lambda a$ and the light having the wavelengths $\lambda b$ and $\lambda c$.

The optical lens 46 of the capturing unit 100 converges the light reflected from the illuminated portion 14 of the subject 12. The separation unit 50 is a prism that optically separates the reflected light into three wavelength components $\lambda a$, $\lambda b$ and $\lambda c$ to separate optical paths. The light-receiving units 60a, 60b and 60c are three panels of solid state image sensors. The light beams having the wavelengths $\lambda a$, $\lambda b$ and $\lambda c$ separated by the separation unit 50 are received by the light-receiving units 60a, 60b and 60c, respectively. The light beam received by each light-receiving unit is read as the electric charges by a photoelectric effect. The electric charges are converted into a digital electric signal by an A-D converter (not shown) to be input to the processing unit 110.

Figure 7:
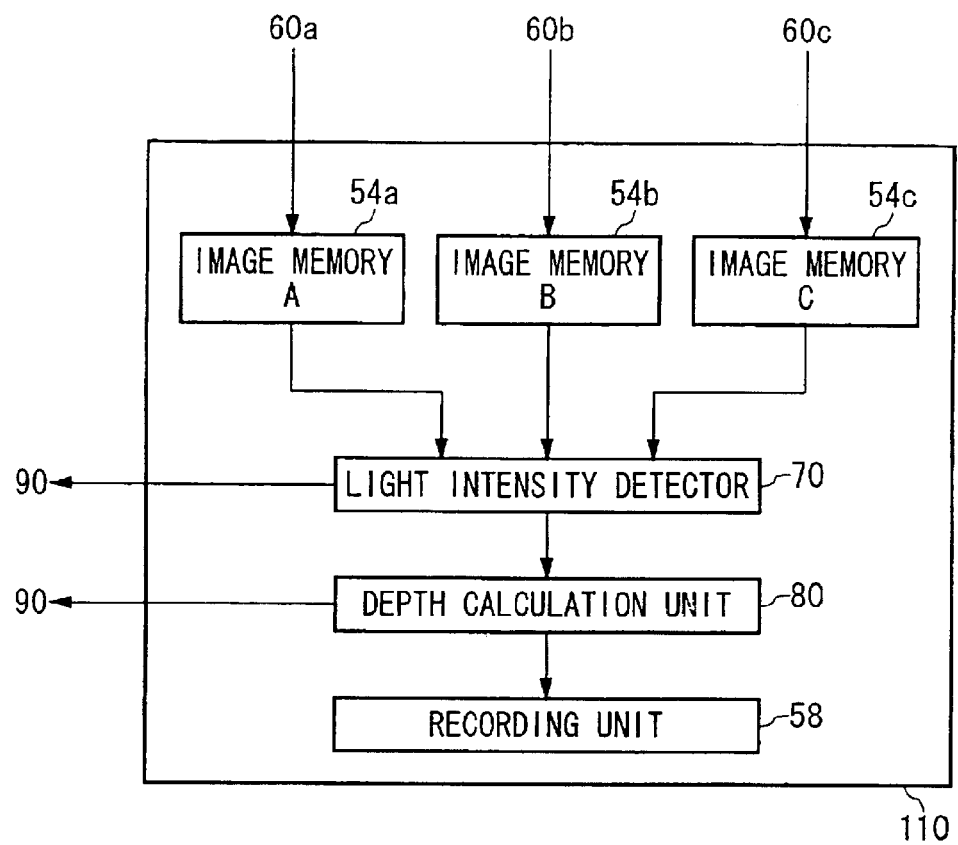
FIG. 7 shows a structure of a processing unit 110 according to the first embodiment of the present invention.

FIG. 7 shows the structure of the processing unit 110 in the present embodiment. The images of the subject output from the light-receiving units 60a, 60b and 60c are stored in image memories 54a, 54b and 54c, respectively. The light intensity detector 70 detects the reflected-light intensity for each of the wavelengths $\lambda a$, $\lambda b$ and $\lambda c$ by using the image data stored in the respective image memories 54a, 54b and 54c. The depth calculation unit 80 obtains the distance from the illumination unit 40 to the illuminated portion 14 of the subject 12 by using the reflected-light intensities for the wavelengths $\lambda a$, $\lambda b$ and $\lambda c$ detected by the light intensity detector 70 and the distance from the illumination unit 40 to the optical lens (optical converging unit) 46 or the light-receiving unit 60. The depth calculation unit 80 calculates, for each pixel or pixel area of the captured image, the depth-direction distance to the subject 12 captured in the pixel or the pixel area, thereby obtaining the depth distribution of the subject 12. The depth distribution thus obtained is output from the depth calculation unit 80 to be recorded by the recording unit 58.

The light intensity detector 70 outputs the reflected-light intensities for the wavelengths $\lambda a$, $\lambda b$ and $\lambda c$ to the controller 90. The depth calculation unit 80 outputs the depth-distribution information of the subject 12 to the controller 90. The controller 90 adjusts the intensity of the light emitted from the light-source unit 44, if the intensity level is not appropriate.

Figure 8:
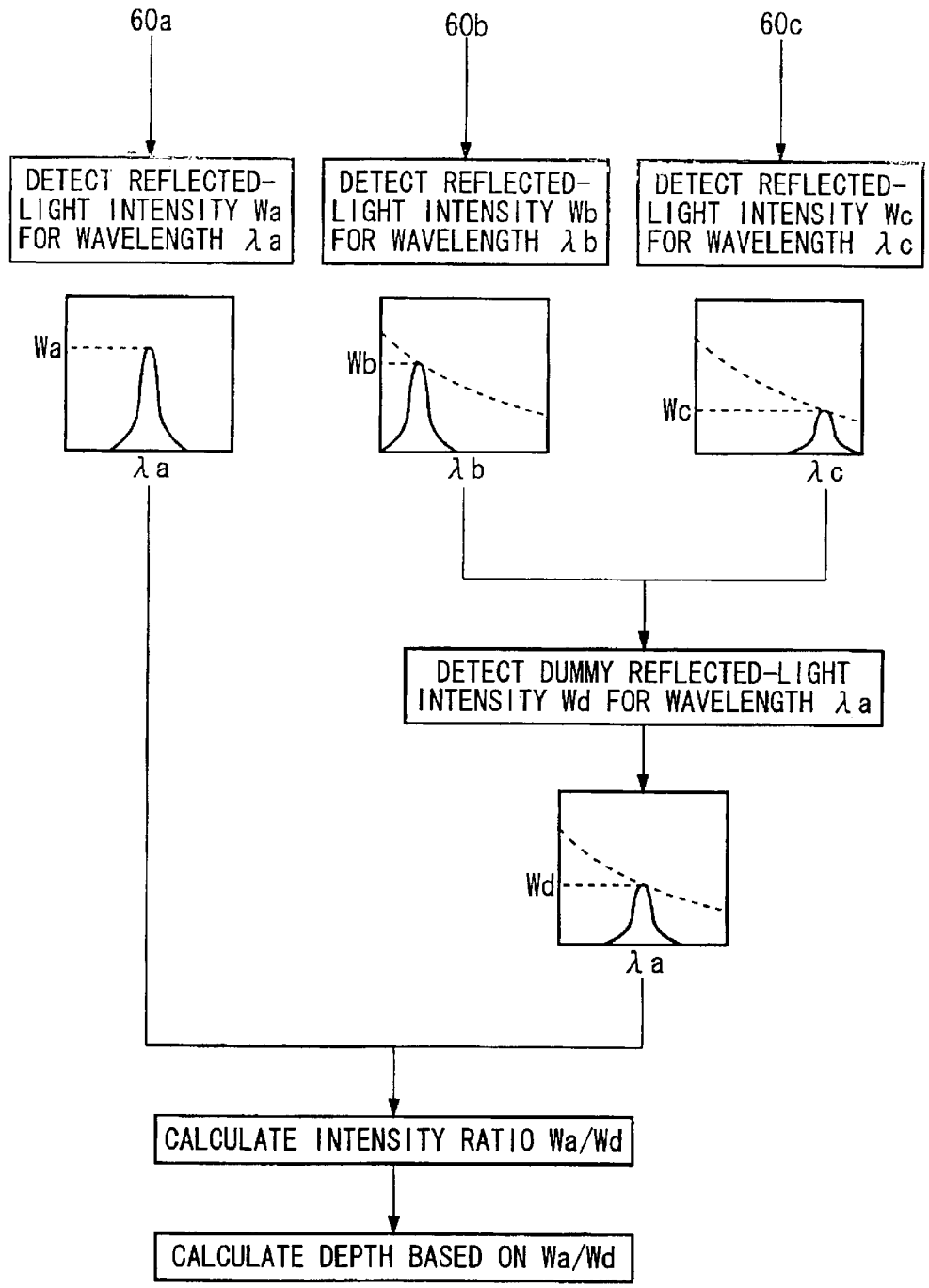
FIG. 8 is a diagram for explaining a method for calculating a depth-direction distance to a subject 12.

FIG. 8 is a diagram for explaining a method of calculating the depth-direction distance by the light intensity detector 70 and the depth calculation unit 80. The first illumination light beam that mainly contains the component of the wavelength $\lambda a$ and has the first intensity distribution and the second illumination light beam that mainly contains the components of the wavelengths $\lambda b$ and $\lambda c$ and has the second intensity distribution different from the first intensity distribution are cast onto the subject 12 (not shown), and the light beams reflected from the subject 12 are than received by the light-receiving unit 60.

The light intensity detector 70 detects the intensity Wa of the reflected light having the wavelength $\lambda a$, the intensity Wb of the reflected light having the wavelength $\lambda b$ and the intensity Wc of the reflected light having the wavelength $\lambda c$. The depth calculation unit 80 obtains a dummy reflected-light intensity Wd that is expected to be obtained in a case where it is assumed that the second illumination light beam mainly contains the component of the wavelength $\lambda a$ and has the second intensity distribution, by using the intensity Wb of the reflected light having the wavelength $\lambda b$ and intensity Wc of the reflected light having the wavelength $\lambda c$. Then, a ratio Wa/Wd of the actual reflected-light intensity Wa to the dummy reflected-light intensity Wd is calculated, so as to calculate the distance to the subject 12 or the depth of the subject 12 based on the distance from the illumination unit 40 (not shown) to the optical lens 46 (not shown) or the light-receiving unit 60 and the intensity ratio Wa/Wd.

Both the actual reflected-light intensity Wa and the dummy reflected-light intensity Wd are obtained for the wavelength $\lambda a$. Thus, adverse effects of the difference of the surface reflectance of the illuminated portion 14 of the subject 12 between wavelengths can be cancelled. Moreover, since the dummy reflected-light intensity Wd is calculated from the actual reflected-light intensities Wb and Wc obtained for the wavelengths $\lambda b$ and $\lambda c$ that are different from the wavelength $\lambda a$, the error that may cause in the wavelength-separation can be reduced by setting the interval between the wavelengths so as to make the separation of the components of the wavelengths $\lambda a$, $\lambda b$, and $\lambda c$ easier, thus the aforementioned dilemma can be eliminated.

It should be noted that there are many modifications of the calculation method for obtaining the dummy reflected-light intensity Wd by using the intensities Wb and Wc of the reflected light beams having the wavelengths $\lambda b$ and $\lambda c$.

Figure 9A:
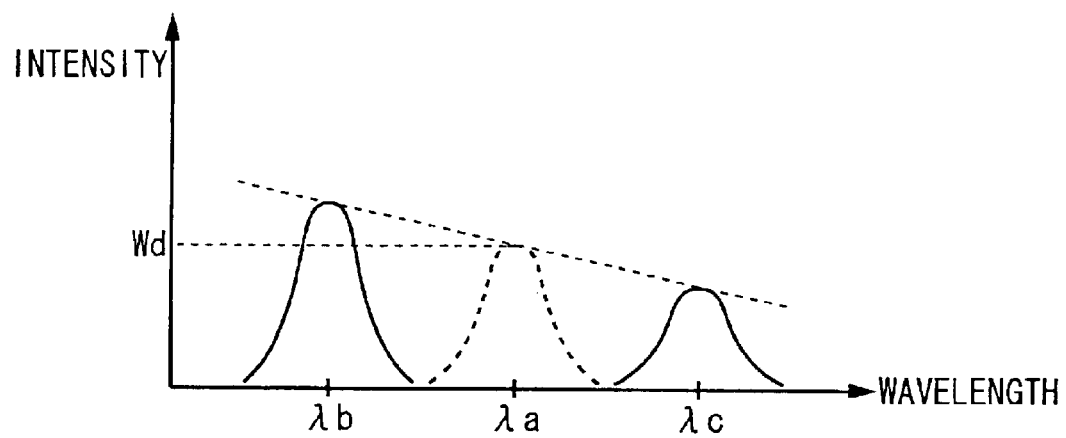
FIGS. 9A and 9B are diagrams for explaining a method for obtaining a dummy reflected-light intensity Wd by interpolation or extrapolation.
Figure 9B:
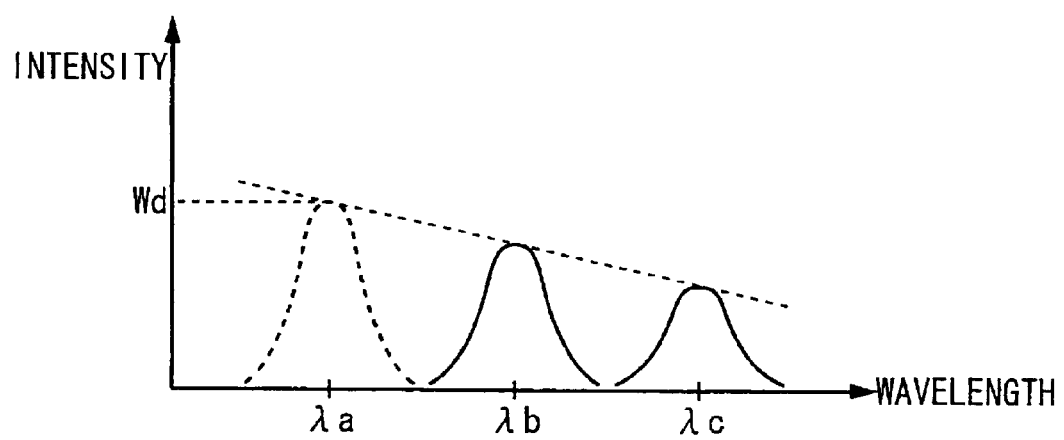

FIG. 9 is a diagram for explaining an exemplary method for obtaining the dummy reflected-light intensity Wd by interpolation or extrapolation. In this method, the dummy reflected-light intensity Wd for the wavelength λa is obtained by interpolation or extrapolation of the reflected-light intensity Wb for the wavelength λb and the reflected-light intensity Wc for the wavelength λc. A middle value between the reflected-light intensity Wb for the wavelength λb and the reflected-light intensity Wc for the wavelength λc may be simply used as the dummy reflected-light intensity Wd with the wavelengths λa, λb and λc set in such a manner that the wavelength λa is equal to the middle value between the wavelengths λb and λc, as shown in FIG. 9A. Alternatively, the dummy reflected-light intensity Wd may be obtained by extrapolation or linear approximation, as shown in FIG. 9B.

Figure 10A:
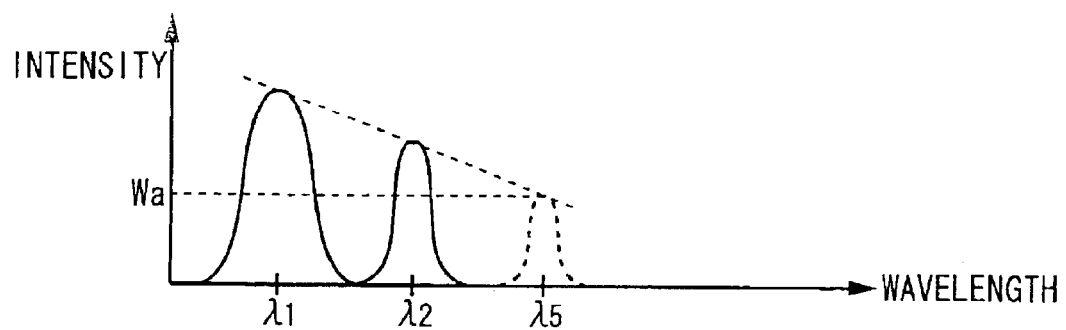
FIGS. 10A and 10B are diagrams for explaining a method for obtaining the dummy reflected-light intensities from the first and second reflected light.
Figure 10B:
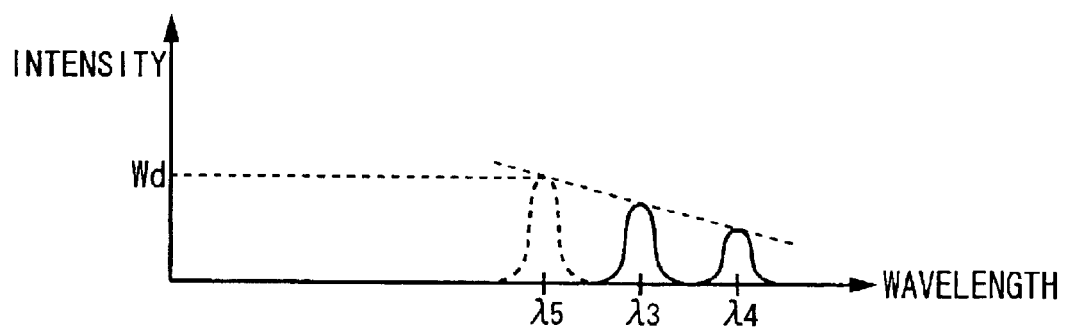

FIGS. 10A and 10B are diagrams for explaining an exemplary method for obtaining the dummy reflected-light intensity from the first and second reflected light beams. In a case where the first reflected light beam mainly contains the wavelengths λ1 and λ2 while the second reflected light beam mainly contains the wavelengths λ3 and λ4, linear interpolation is performed for the intensities for the respective wavelengths so as to calculate the dummy reflected-light intensity Wa and Wd, as shown in FIGS. 10A and 10B. Although the exemplary methods are described with reference to FIG. 9A to FIG. 10B, the method for calculating the dummy reflected-light intensity cannot be limited to those described with reference to FIGS. 9A to 10B.

It is preferable in any of the above-mentioned methods that the wavelengths λb and λc are set to values closer to each other so that it is possible to perform linear interpolation or linear extrapolation for the wavelengths λb and λc, in order to obtain the dummy reflected-light intensity precisely.

Figure 11:
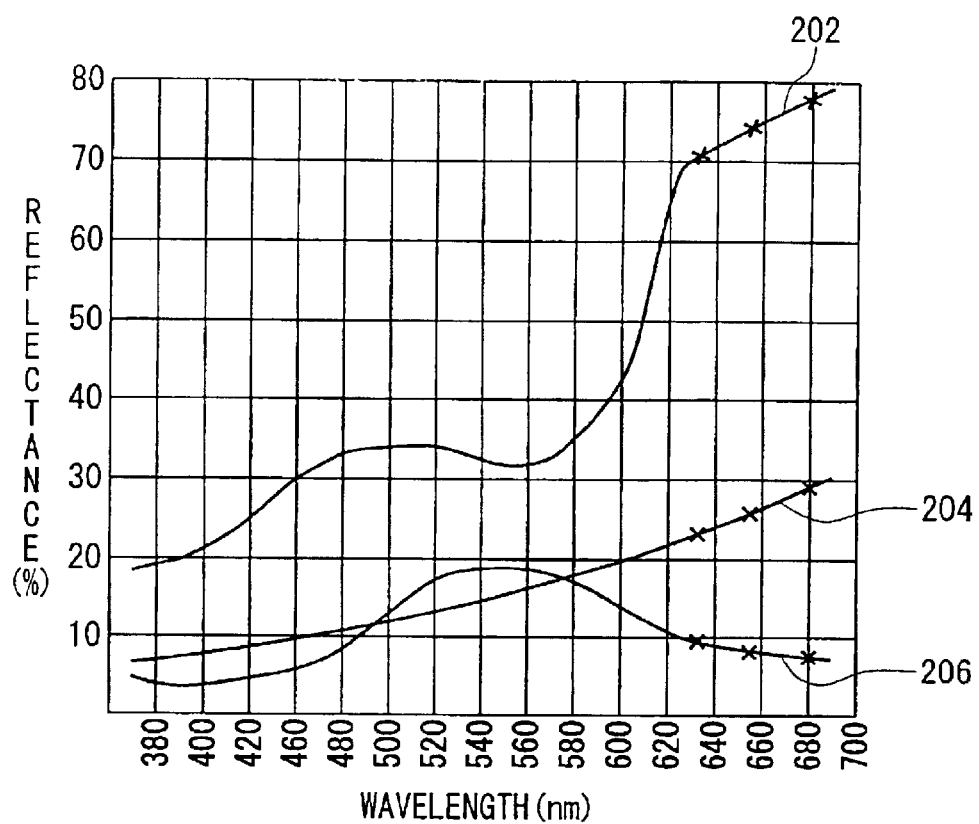
FIG. 11 shows the surface reflectance of each of three kinds of objects.

FIG. 11 shows the surface reflectance of each of three kinds of objects. The horizontal axis represents the wavelength while the vertical axis represents the reflectance. Graphs 202, 204 and 206 respectively show results of surface reflectance measurements for the three kinds of objects, i.e., skin, a road and a leaf, by a spectrometer. In a wavelength region containing 650 nm and wavelengths in the vicinity thereof, interpolation or extrapolation can be performed for any of the three kinds of objects with a considerable precision, as shown by marks on the graphs. Thus, it is preferable to select wavelengths for which interpolation or extrapolation can be performed as the wavelengths λa, λb and λc. Moreover, when image correction such as gray-scale correction, that is performed in a typical digital camera, is performed for the output signal from the solid state image sensor of the light-receiving unit 40, the linearity of the signal is lost. Therefore; it is preferable that the intensity is detected at a phase where the signal intensity has the linearity for the intensity of the light incident on the solid state image sensor and thereafter interpolation is performed. Alternatively, a table showing an inverse function of a signal-conversion function by the image correction such as the gray-scale correction may be prepared in advance. In this case, the signal output after being subjected to the image correction is converted into the signal intensity having the linearity for the intensity of the light incident on the solid state image sensor with reference to the inverse-function table. Then, the intensity detection is performed and interpolation is performed.

In the above description, an optical device for splitting the optical path by separation of the light into wavelength components, such as a prism, is used as the separation unit 50. However, an optical filter arranged on the light-receiving surface of the light-receiving unit 60 may be used as the separation unit 50.

Figure 12:
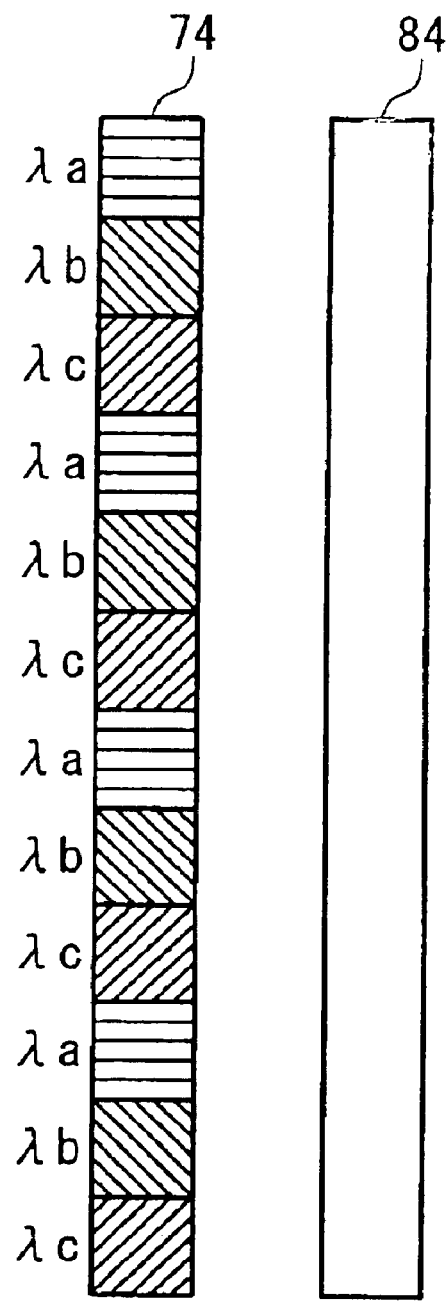
FIG. 12 shows an optical filter provided on a light-receiving unit 60.

FIG. 12 is a diagram for explaining an optical filter that only transmits a specific wavelength component provided on the light-receiving unit 60. As the light-receiving unit 60, a single panel of solid state image sensor 84 is used. On the light-receiving surface of the solid state image sensor 84 is arranged the optical filter 74. The optical filter 74 includes filter portions that only transmit light beams having the wavelengths λa, λb and λc, respectively, that are alternately arranged. Such an arrangement of the optical filter 84 makes it possible to find out which of the light beams having the wavelengths λa, λb and λc is received by a pixel of the solid state image sensor 84, thereby the light beams having the wavelengths λa, λb and λc can be received while being separated from each other. In this case, the size of the whole apparatus can be reduced as compared to a case of using the prism, because the reflected light is received by the single panel of the solid state image sensor 84.

In the above description of the embodiment, in a case where the surface reflectance of the subject largely depends on the wavelength of the illumination light, it is desirable that the wavelengths λa, λb and λc are set as close as possible in order to prevent occurrence of the error in the calculation of the dummy reflected-light intensity. On the other hand, in order to improve the precision of the detection of the reflected-light intensity for the respective wavelengths, it is desirable that inclusion of the components having a wavelength other than the wavelengths λa, λb and λc is made as little as possible or interference between the wavelengths is made as little as possible by setting the wavelengths λa, λb and λc to be values apart from each other so as to improve the resolution of the wavelengths λa, λb and λc. Therefore, it is preferable to design the wavelength characteristics of the light-source unit 44, the wavelength-transmission characteristics of the optical filters, and the wavelength-transmission characteristics of the separation unit 50 of the capturing unit 100 in accordance with the surface-reflectance characteristics of the subject and/or the required measurement precision.

Figure 13:
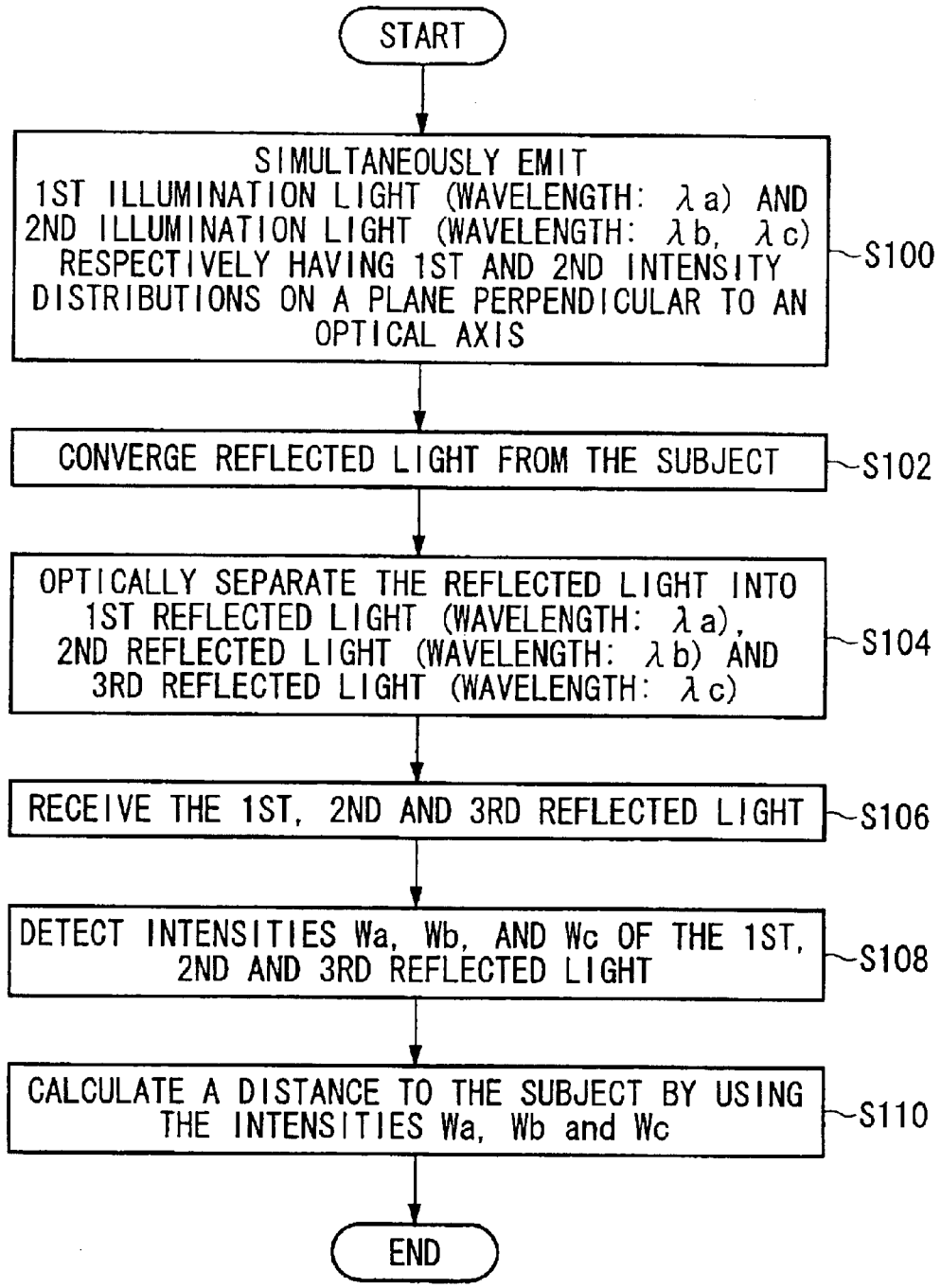
FIG. 13 is a flowchart of a distance measuring method according to the first embodiment of the present invention.

FIG. 13 is a flowchart of the distance measuring method according to the present embodiment. The illumination unit 40 casts the first illumination light beam that mainly contains the wavelength λa and has the first intensity distribution on the plane perpendicular to the optical axis of the first illumination light beam and the second illumination light that mainly contains the wavelengths λb and λc both different from the wavelength λa and has the second intensity distribution on the plane perpendicular to the optical axis thereof onto the subject 12 simultaneously (S100)

The optical lens 46 of the capturing unit 100 converges the reflected light from the subject 12 that is illuminated with the first and second illumination light beams (S102).

The separation unit 50 separates the reflected light from the subject 12 into the first reflected light beam having the wavelength λa, the second reflected light beam having the wavelength λb and the third reflected light beam having the wavelength λc (S104).

The light-receiving unit 60 receives the first, second and third reflected light beams (S106). The light intensity detector 70 of the processing unit detects the intensities Wa, Wb and Wc of the first, second and third reflected light beams (S108).

The depth calculation unit 80 calculates the depth-direction distance to the subject 12 by using the intensities Wa, Wb and Wc of the first, second and third reflected light beams and the distance from the illumination unit 40 to the optical lens 46 or the light-receiving unit 60 (S110).

Figure 14:
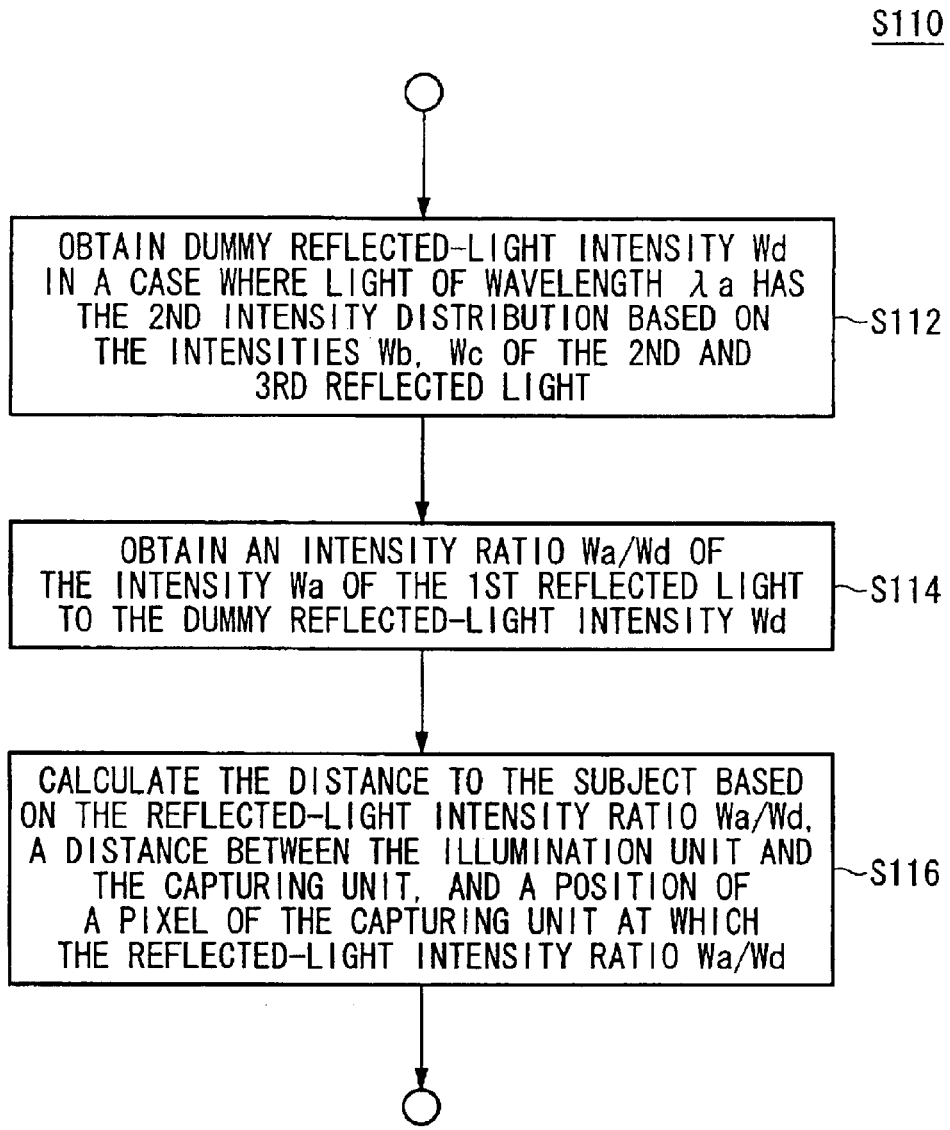
FIG. 14 is a flowchart of a depth calculation process S110.

FIG. 14 is a flowchart of the calculation process of the depth-direction distance S110. First, the dummy reflected-light intensity Wd in a case of assuming that the light containing the wavelength λa has the second intensity distribution is obtained based on the intensities Wb and Wc of the second and third reflected light beams (Sll2).

The dummy reflected-light intensity Wd is obtained by interpolation or extrapolation of the intensities Wb and Wc of the second and third reflected light beams. Then, the ratio Wa/Wd of the intensity Wa of the first reflected light beam to the dummy reflected-light intensity Wd is obtained (S114). Based on the intensity ratio Wa/Wd, the distance from the illumination unit 40 to the optical lens 46 or the light-receiving unit 60, and the position of the pixel that provides the reflected-light intensity ratio Wa/Wd, the distance to the subject 12 is calculated (Sll6).

Figure 15:
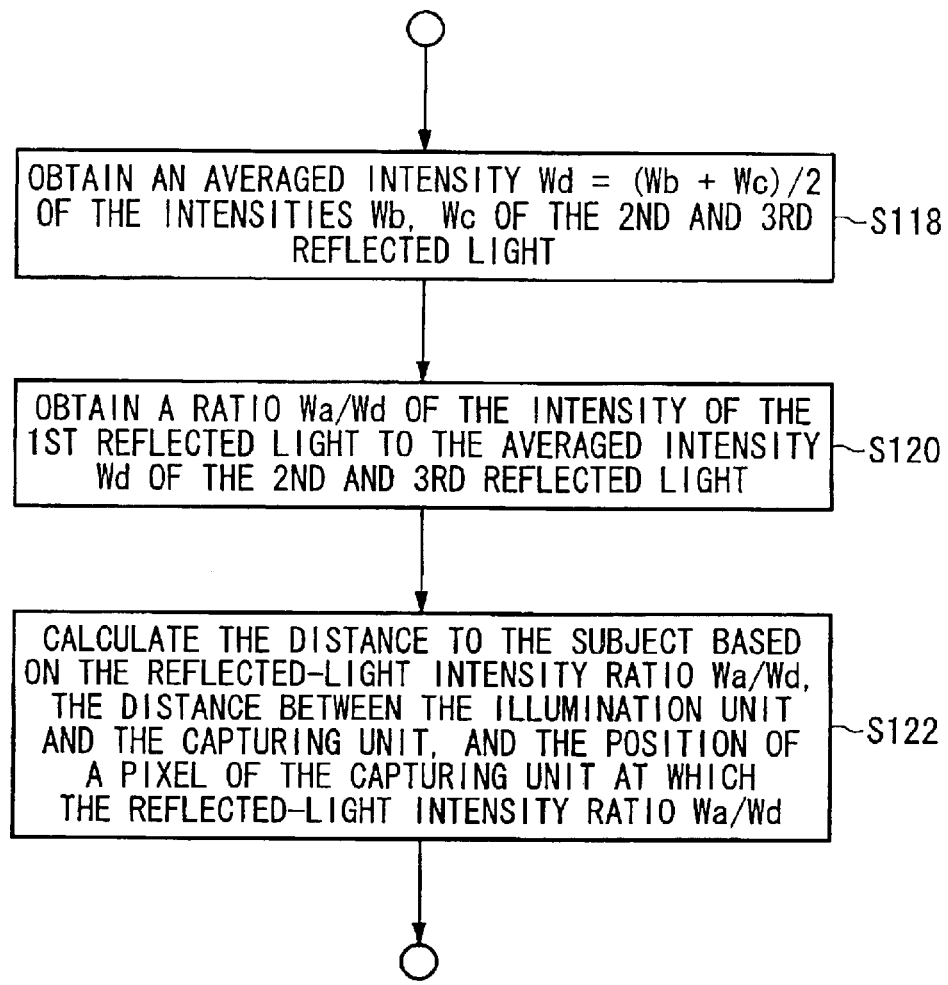
FIG. 15 is a flowchart of a modification of the depth calculation process S110.

FIG. 15 is a flowchart of an example of the calculation process of the depth-direction distance S110. First, an average intensity Wd=(Wb+Wc)/2 of the intensities Wb and Wc of the second and third reflected light beams is obtained (S118). Then, the ratio Wa/Wd of the intensity Wa of the first reflected light beam to the averaged intensity Wd of the second and third reflected light beams is obtained (S120). Based on the reflected-light intensity ratio Wa/Wd, the distance from the illumination unit 40 to the optical lens 46 or the light-receiving unit 60 of the capturing unit 100, and the position of the pixel of the capturing unit 100 that provides the reflected-light intensity ratio Wa/Wd thus obtained, the distance to the subject 12 is calculated (S122).

As described above, according to the image capturing apparatus of the present embodiment, the illumination light beams having different wavelength characteristics and different intensity distributions are cast onto the subject simultaneously. The light reflected from the subject is separated into wavelength components in accordance with the wavelength characteristics. Then, the depth-direction distance to the subject can be easily obtained by using the intensities of the reflected light beams separated from each other.

In addition, since the image of the subject carried by the reflected light is captured in the solid state image sensor and is then stored as image data, the depth-direction distance can be calculated by detecting the reflected-light intensity for each pixel or pixel area. Thus, the depth distribution of the region of the subject that is captured can be obtained. Accordingly, the depth distribution of the subject can be obtained from a two-dimensional image of the subject so as to create a three-dimensional image of the subject.

Figure 16:
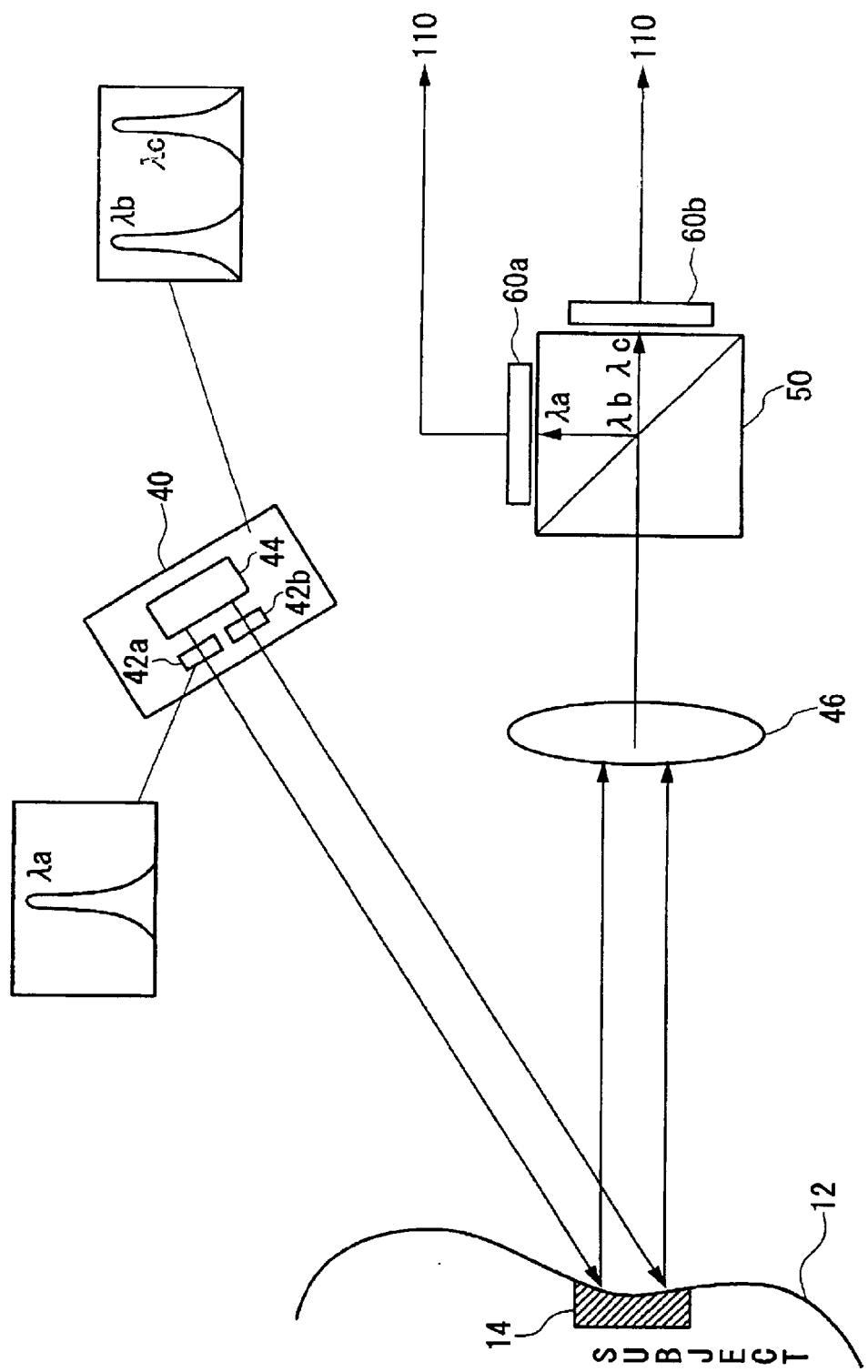
FIG. 16 shows another example of the arrangement of the illumination unit 40 and the capturing unit 100 according to the first embodiment of the present invention.

FIG. 16 illustrates another exemplary structure of the image capturing apparatus according to the first embodiment. The image capturing apparatus of the present example is the same as that of that described with reference to FIG. 6 except for the arrangement of the illumination unit 40 and the capturing unit 100, and therefore the description for the same components is omitted and only the illumination unit 40 and the capturing unit 100 are described below. FIG. 16 is a diagram showing the arrangement of the illumination unit 40 and the capturing unit 100 in the present example. In the present example, the optical filter 42a of the illumination unit 40 transmits light mainly containing a wavelength λa, while the optical filter 42b transmits light mainly containing a wavelength λb shorter than the wavelength λa and light having a wavelength λc longer than the wavelength λa. The illumination unit 40 casts the first illumination light beam that mainly contains the wavelength λa and has the first intensity distribution on the plane perpendicular to the optical axis of the first illumination light beam and the second illumination light beam that mainly contains the wavelengths λb and λc and has the second intensity distribution on the plane perpendicular to the optical axis of the second illumination light beam onto the illuminated portion 14 of the subject 12 simultaneously. The separation unit 50 of the capturing unit 100 is a prism that separates the light beam mainly containing the wavelength λa from the light beam mainly containing the wavelengths λb and λc to split the optical paths thereof. The light-receiving units 60a and 60b are two panels of solid state image sensors. The light beam having the wavelength a separated by the separation unit 50 is received by the light-receiving unit 60a, while the light beam having the wavelengths λb and λc is received by the light-receiving unit 60b. The light beams received by the light-receiving units 60a and 60b are converted into electric signals to be input to the processing unit 110, respectively.

Figure 17:
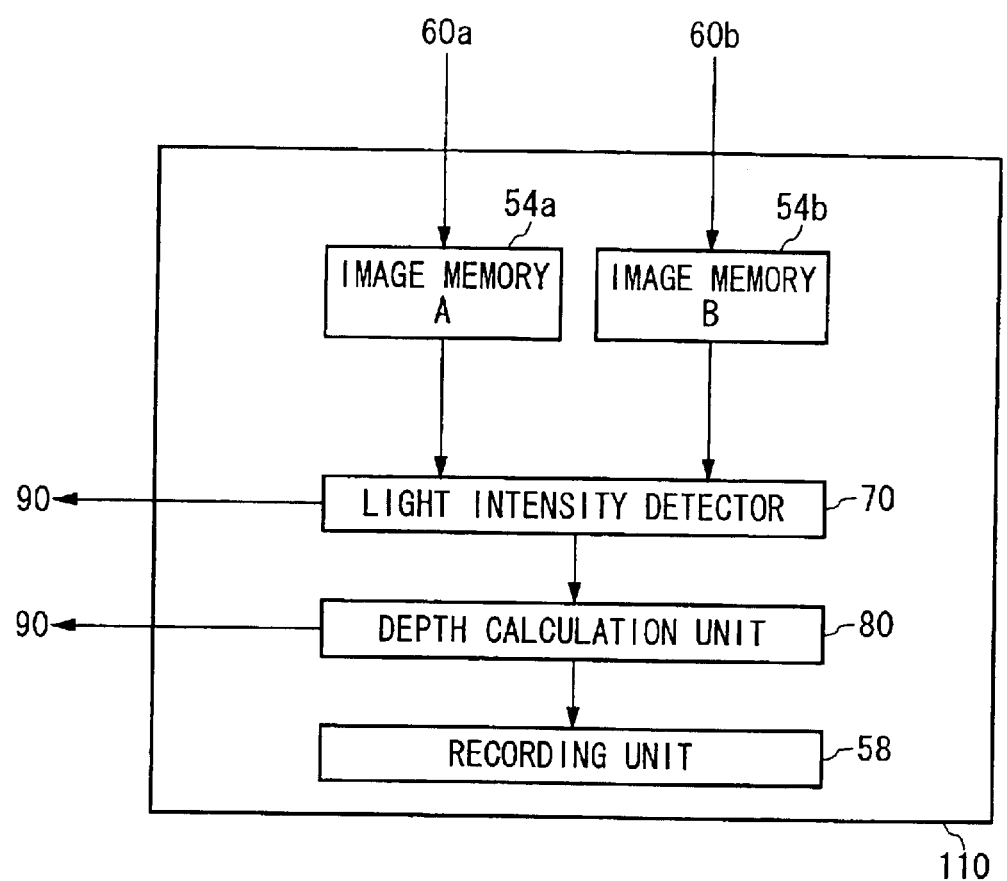
FIG. 17 shows the structure of the processing unit 110 in the other example of the first embodiment of the present invention.

FIG. 17 is a diagram showing the structure of the processing unit 110 in the present example. The images of the subject output from the light-receiving units 60a and 60b are stored in the image memories 54a and 54b, respectively. The light intensity detector 70 detects the intensity of the reflected light having the wavelength λa and the intensity of the reflected light having the wavelengths λb and λc by using the image data stored in the respective image memories 54a and 54b. The depth calculation unit 80 obtains the depth of or the distance to the illuminated portion 14 of the subject 12 by using the intensity of the reflected light having the wavelength λa and the intensity of the reflected light having the wavelengths λb and λc detected by the light intensity detector 70. The depth calculation unit 80 calculates, for each pixel or pixel area, the depth-direction distance to the illuminated portion 14 of the subject 12 taken in the pixel or the pixel area so as to obtain the depth distribution of the subject 12. The obtained depth-distribution information is output to the recording unit 58. The recording unit 58 records the depth-distribution information.

Figure 18:
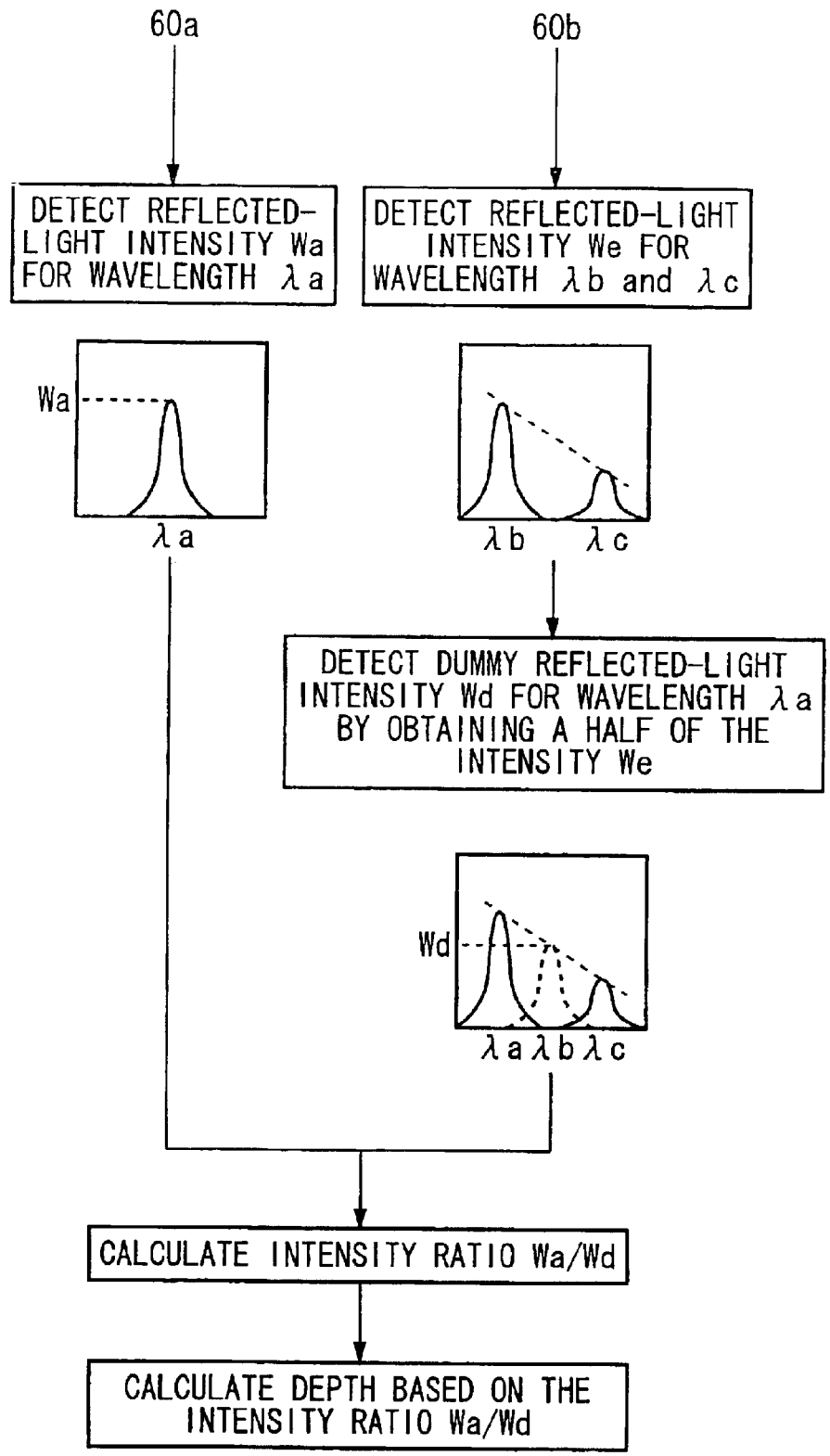
FIG. 18 is a diagram for explaining the depth-direction distance calculating method in the other example of the first embodiment of the present invention.

FIG. 18 is a diagram for explaining the depth-direction distance calculation method by the light intensity detector 70 and the depth calculation unit 80. The light intensity detector 70 detects the intensity Wa of the reflected light having the wavelength λa and the intensity We of the reflected light having the wavelengths λb and λc. The depth calculation unit 80 sets Wd to a half value of the intensity We of the reflected light having the wavelengths λb and λc. Since the wavelength λa is a middle value between the wavelengths λb and λc, the value of Wd is approximately equal to the dummy reflected-light intensity obtained in a case of assuming that the light having the wavelength λa and having the second intensity distribution is cast onto the illuminated portion 14 of the subject 12. Then, the intensity ratio Wa/Wd of the actual reflected-light intensity Wa to the dummy reflected-light intensity Wd is calculated, and thereafter the depth-direction distance to the subject is calculated based on the distance from the illumination unit 40 (not shown) to the optical lens 46 (not shown) or the light-receiving unit 60 and the intensity ratio Wa/Wd.

Both of the reflected-light intensity Wa and the dummy reflected-light intensity Wd are obtained for the wavelength λa the adverse effect of the difference of the surface reflectance of the illuminated portion of the subject 12 between the wavelengths can be cancelled. Moreover, the dummy reflected-light intensity Wd is obtained from the intensities of the reflected light mainly containing the wavelengths λb and λc both different from the wavelength λa, the error that may occur in the wavelength-separation can be reduced by setting an interval between the wavelengths so as to allow easier wavelength-separation.

In order to obtain the dummy reflected-light intensity Wd precisely, it is preferable that the wavelength λa is the middle wavelength of the wavelengths λb and λc. In the above description, the separation unit 50 separates the light having the wavelength a from the light having the wavelengths λb and λc. However, it is not necessary to selectively transmit the light having the wavelengths λb and λc for the purpose of filtering. The same effects as those described above can be obtained in a case of using a band-cut filter that cuts the light having the wavelength λa.

Figure 19:
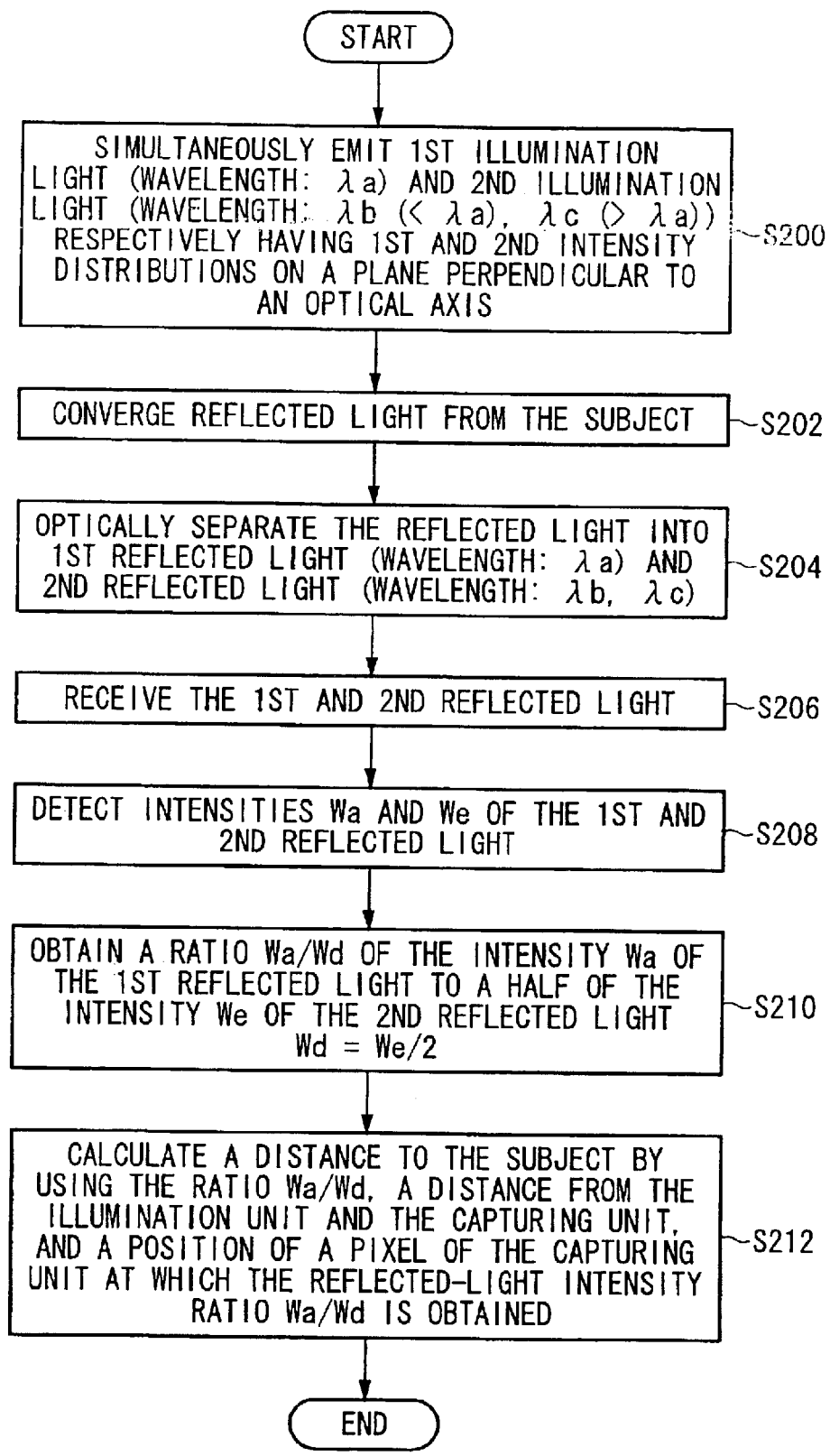
FIG. 19 is a diagram for explaining the distance measuring method in the other example of the first embodiment of the present invention.

FIG. 19 is a flowchart of the distance measuring method of the present example. The illumination unit 40 casts the first illumination light containing main wavelength component λa and having the first intensity distribution on the plane perpendicular to the optical axis of the first illumination light beam and the second illumination light containing the main wavelength components λb and λc and having the second intensity distribution on the plane perpendicular to the optical axis of the second illumination light beam onto the subject 12 simultaneously (S200). Please note that the wavelengths λb is shorter than the wavelength λa while the wavelength λc is longer than the wavelength λa.

The optical lens 46 converges the reflected light from the subject 12 that is illuminated with the first and second illumination light beams (S202). The separation unit 50 optically separates the reflected light from the subject 12 into the first reflected light beam having the wavelength λa and the second reflected light beam having the wavelengths λb and λc (S204).

The light-receiving unit 60 receives the separated first and second reflected light beams (S206). The light intensity detector 70 detects the intensities Wa and We of the first and second reflected light beams (S208).

The depth calculation unit 80 obtains the ratio Wa/Wd of the intensity Wa of the first reflected light beam to a half Wd of the intensity We of the second reflected light beam (S210), and calculates the distance to the subject 12 based on the reflected-light intensity ratio Wa/Wd, the distance from the illumination unit 40 to the optical lens 46 or the light-receiving unit 60 of the capturing unit 100, and the position of the pixel of the capturing unit 100 that provides the reflected-light intensity Wa/Wd (S212).

As described above, according to the image capturing apparatus of the present example, the first illumination light beam having the first wavelength as the main component and the first intensity distribution on the plane perpendicular to the optical axis of the first illumination light beam and the second illumination light mainly having the second and third wavelengths between which the first wavelength exists as the middle wavelength and the second intensity distribution different from the first intensity distribution are cast onto the subject simultaneously. The reflected light from the subject is then separated into the first reflected light beam having the first wavelength and the second reflected light beam having the second and third wavelengths. Based on the ratio of the intensity of the first reflected light beam to a half of the intensity of the second reflected light beam, the depth-direction distance to the subject can be calculated. Since the dummy reflected-light intensity in a case where the light containing the first wavelength has the second intensity distribution can be obtained only by obtaining a half of the intensity of the second reflected light beam, it is possible to calculate the depth-direction distance to the subject very easily. In addition, according to the present example, since the number of the solid state image sensors for receiving the reflected light from the subject can be reduced to two, the size of the whole apparatus can be reduced.

Figure 20:
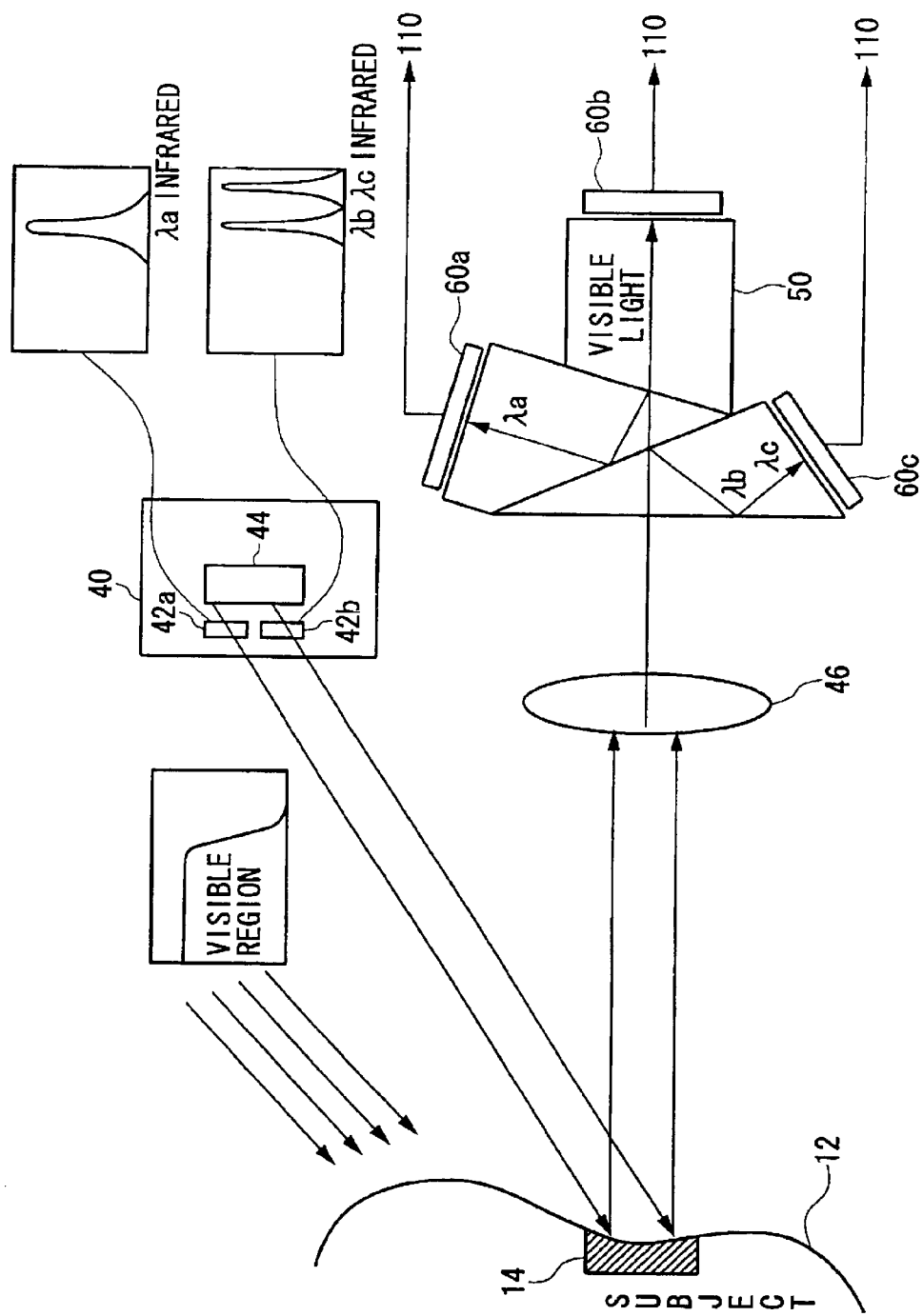
FIG. 20 shows still another example of the arrangement of the illumination unit 40 and the capturing unit 100 according to the first embodiment of the present invention.

FIG. 20 illustrates still another exemplary structure of the image capturing apparatus according to the first embodiment. The image capturing apparatus in the present example is the same as that described with reference to FIG. 6 except for the arrangement of the illumination unit 40 and the capturing unit 100. Therefore, the description for the same components as those in FIG. 6 is omitted but only illumination unit 40 and the capturing unit 100 are described below. FIG. 20 is a diagram showing the arrangement of the illumination unit 40 and the capturing unit 100 in the present example. In the present example, the light beams emitted from the illumination unit 40 are infrared light beams. The optical filter 42a transmits light having a wavelength λa in an infrared region while the optical filter 42b transmits light having wavelengths λb and λc in the infrared region. The illumination unit 40 casts the first illumination light containing the main wavelength component λa and the first intensity distribution on the plane perpendicular to the optical axis of the first illumination light beam and the second illumination light containing the main wavelength components λb and λc and the second intensity distribution on the plane perpendicular to the optical axis of the second illumination light beam onto the subject 12 simultaneously. The first intensity distribution and the second intensity distribution are different from each other. The subject 12 is also illuminated with other light having wavelengths in a visible region, for example, natural light or light from lighting.

The separation unit 50 of the capturing unit 100 is a prism for separating the light having the wavelength λa in the infrared region, the light having the wavelengths λb and λc in the infrared region and the light having wavelengths in the visible region so as to split optical paths from each other. The light-receiving units 60a, 60b and 60c are three panels of solid state image sensors. The light having the wavelength λa, the light having the wavelengths λb and λc, and the light in the visible region are received by the light-receiving units 60a, 60b and 60c, respectively. In order to prevent the captured images by the light in the infrared region from being out of focus, the light-receiving units 60a and 60b are adjusted in advance so as to form the images in focus. The light beams received by the light-receiving units 60a, 60b and 60c are converted into electric signals to be input to the processing unit 110, respectively.

Figure 21:
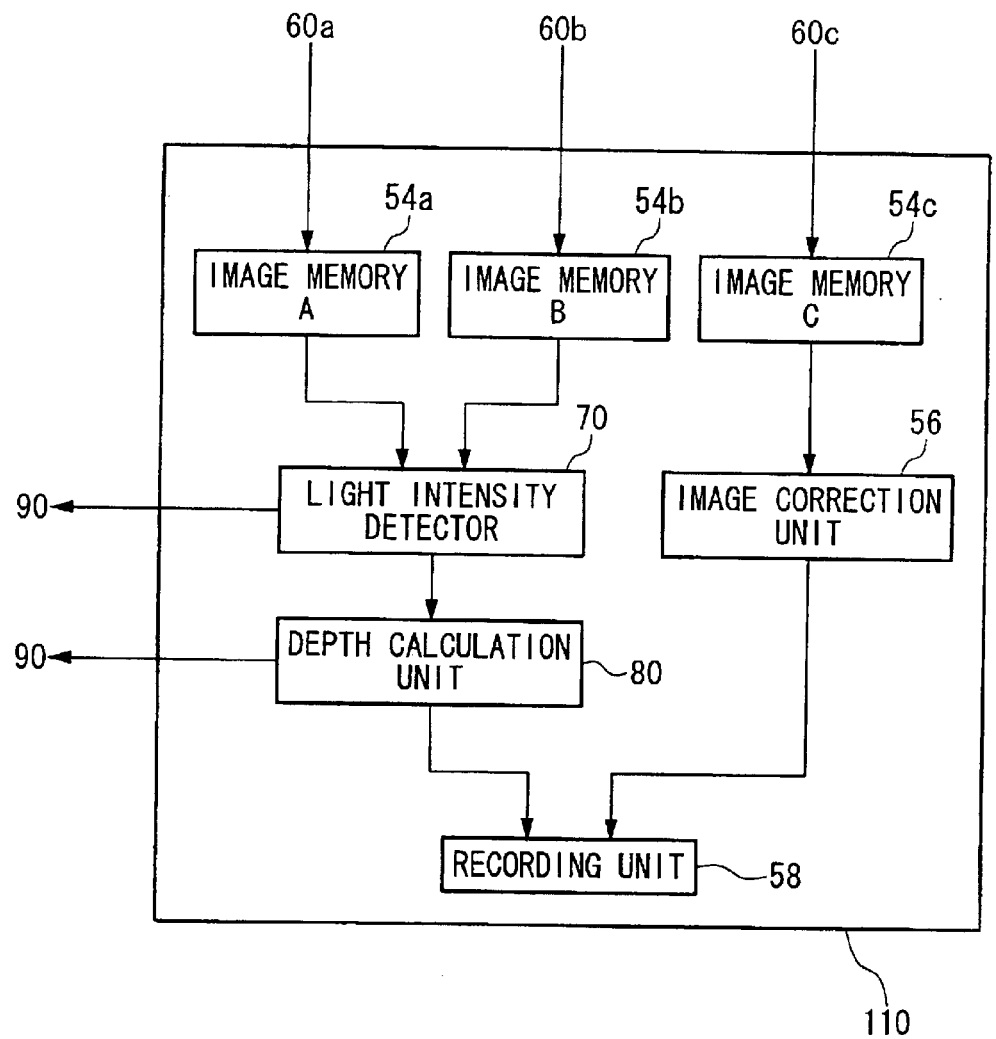
FIG. 21 shows the structure of the processing unit 110 in the other example of the first embodiment of the present invention.

FIG. 21 is a diagram showing the structure of the processing unit 110 in the present example. The images of the subject output from the light-receiving units 60a and 60b are stored in the image memories 54a and 54b, respectively. The light intensity detector 70 detects the reflected-light intensities by using the image data stored in the respective image memories 54a and 54b, and the depth calculation unit 80 obtains the depth-direction distance to the subject 12 by using the reflected-light intensities detected by the light intensity detector 70. The operations of the light intensity detector 70 and the depth calculation unit 80 are similar to those in the examples described with reference to FIGS. 6 and 16, and therefore the description is omitted.

The depth calculation unit 80 calculates, for each pixel or pixel area, the depth-direction distance to the subject 12 taken in the pixel or pixel area, and then obtains the depth distribution of the subject 12 so as to output the obtained depth distribution. The recording unit 58 records the depth-distribution information of the subject. The image correction unit 56 performs image correction, such as gray-scale correction, for the image data stored in the image memory 54c so as to output the corrected image data as image data of the subject 12. The recording unit 58 records the image data of the subject 12 together with the depth-distribution information of the subject 12.

In the above description, the reflected light having the wavelengths λb and λc is received by the light-receiving unit 60b without being separated by wavelength from each other. However, in an alternative example, the light having the wavelength λb and the light having the wavelength λc maybe separated by the separation unit 50 with four panels of solid state image sensors serving as the light-receiving unit 60. The reflected light beams thus separated are received by different solid state capturing devices. In this case, the depth-direction distance to the subject can be obtained by using the intensities of the reflected light beams respectively having the wavelengths λa λb and λc in accordance with the same method as that described with reference to FIG. 3.

As described above, according to the image capturing apparatus of the present example, the infrared light is used for measuring the depth-direction of the subject. Thus, even in the conditions where the subject is also illuminated with natural light or light from lighting, the depth-direction distance of the subject can be measured. Therefore, it is not necessary to keep a room dark in order to measure the depth-direction distance of the subject. In addition, since the image of the subject carried by the reflected light in the visible region can be separated, the photographic image of the subject can be taken while the depth distribution of the subject is being measured. Thus, it is possible to perform an image processing for the subject using the depth distribution, for example, extraction of a main subject from the taken image based on the depth distribution or separation of a background and an image of a person.

Although the first and second illumination light beams have the intensity distributions on the optical axes thereof that are different from each other in the above first embodiment, the first and second illumination light beams may slit light beams each of which extends in a vertical direction and may be swept while the intensity of each illumination light beam is changed along a horizontal direction. In this case, a manner of changing the intensity of the first illumination light beam is made different from that of the second illumination light beam. If the subject is moving, it is desirable to sweep the first and second illumination light beams at a considerably high sweeping speed.

Although the optical filter 42 has the first or second transmittance distribution, the optical filter 42 may have another transmittance distribution in which the wavelength of the light that can pass through the optical filter 42 varies on the incident surf ace. In this case, the image capturing apparatus of the present embodiment, the light-receiving unit calculates the depth-direction distance to the subject based on the wavelength of the reflected light received thereby.

(Embodiment 2)

Figure 22A:
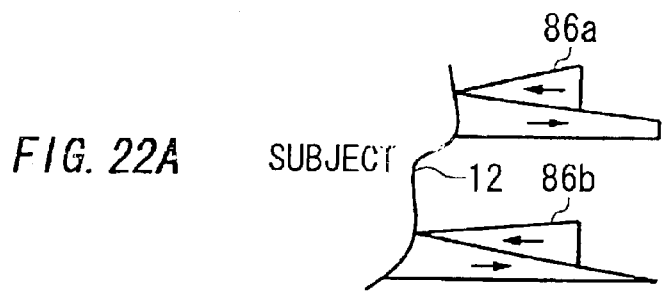
FIGS. 22A, 22B, 22C, 22D and 22E are diagrams for explaining a basic principle of the second embodiment of the present invention.

FIGS. 22A to 22E are diagrams for explaining the principle of the second embodiment of the present invention. In FIG. 22A, light beams 86a and 86b are cast onto the subject 12. The light beams 86a and 86b have intensities which decrease along a direction in which the light beams 86a and 86b travel. The decreasing rate of the intensity of the light beam 86a is the same as that of the light beam 86b. The light beams 86a and 86b are reflected by the subject 12, so as to generate reflected light beams. When the intensities of the reflected light beams are detected, the depth-distribution information of the subject 12 from the detected intensity of the reflected light beams is obtained. In other words, when a distant illuminated portion is illuminated with the light beams, the intensities of the reflected light beams are weak. On the other hand, when a closer portion is illuminated with the light beams, the intensities of the reflected light beams are stronger. If the reflectance of the subject 12 is preknown, the distances to the illuminated portions of the subject 12 that are illuminated with the light beams 86a and 86b, respectively, can be calculated from the intensities of the respective reflected light beams, the intensities of the light beams 86a and 86b when they were emitted, the intensity-modulation rate of the light beam modulated by the modulation unit 82, the reflectance of the subject 12 and the velocity of light. However, it is very hard to measure the reflectance for all possible subjects in advance.

Figure 22B:
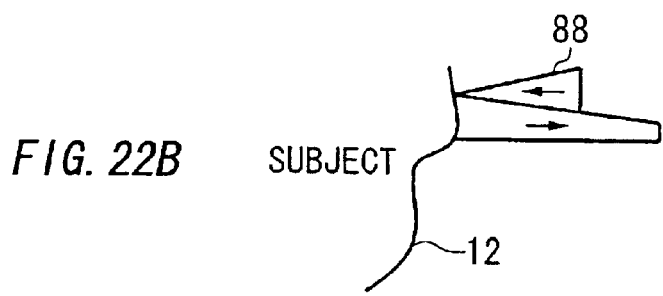
Figure 22C:
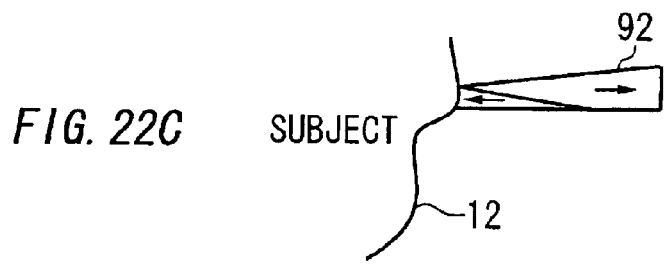
Figure 22D:
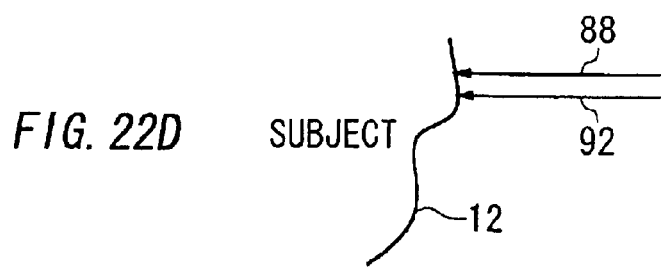

Thus, as shown in FIG. 22B, a light beam 88 having an intensity that decreases along the traveling direction of the light beam 88 is first cast onto the subject 12. The light beam 88 is reflected from the subject 12 to generate a reflected light beam. Then, as shown in FIG. 22C, a light beam 92 having an intensity that increases along the traveling direction of the light beam 92 is cast onto the subject 12. The light beam 92 is also reflected from the subject 12 to generate a reflected light beam. Then, the intensities of these reflected light beams generated by reflection of the light beams 88 and 92 by the subject 12 are detected, and the ratio of the intensities is also calculated. By calculation of the distance to the subject 12 based on the reflected-light intensity ratio, adverse effects of the reflectance of the subject 12 can be canceled.

Figure 22E:
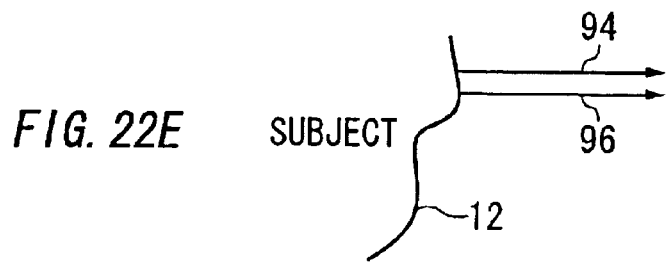

In the aforementioned method, however, the light beams 88 and 92 are cast onto the subject 12 one by one and the intensity of the reflected light beam is performed for each of the light beams 88 and 92. Thus, there arises a time difference between the detection of the reflected-light intensity for the light beam 88 and that for the light beam 92, and therefore the aforementioned method cannot be applied to a case where of the subject is moving. In order to overcome this problem, in a method shown in FIG. 22D, the light beams 88 and 92 are provided with different wavelength characteristics and are cast onto the subject 12 simultaneously. Also in this case, the light beam 88 has the intensity that decreases along the traveling direction thereof as shown in FIG. 22B, while the light beam 92 has the intensity that increases along the traveling direction thereof as shown in FIG. 22C. The light beams 88 and 92 are reflected from the subject 12, as shown in FIG. 22E, so that reflected light beams are generated. The reflected light beams from the subject 12 are separated into wavelength components in accordance with the wavelengths thereof, and are subjected to the reflected-light intensity detection, thereby the depth-direction distance of the subject 12 can be measured.

However, since the subject 12 has the difference of the surface reflectance between the wavelengths, the calculation of the depth-direction distance may contain an error. In order to reduce the calculation error, it is necessary to reduce the difference between the wavelengths λ1 and λ2 of the light beams 88 and 92, respectively. On the other hand, when the difference between the wavelengths λ1 and λ2 is reduced, the precision of the separation by the wavelength is also reduced, thereby generating the error. Therefore, there arises the aforementioned dilemma and that prevents the improvement of the precision of the distance measurement.

Accordingly, the first and second illumination light beams are cast on the subject simultaneously. The first light beam has the first wavelength characteristics and is modulated in such a manner that the intensity increases along the traveling direction of the first light beam, while the second illumination light beam has the second wavelength characteristics different from the first wavelength characteristics and is modulated in such a manner that the intensity decreases along the traveling direction thereof. Then, the reflected light beam generated from the first illumination light beam and the reflected light beam generated from the second illumination light beam are optically separated from each other. Then, the dummy reflected-light intensity that is expected to be obtained in a case where a light beam having the first wavelength characteristics is modulated in such a manner that the intensity decreases along the traveling direction of the first illumination light beam is calculated by using the reflected light beam generated from the second illumination light beam. Finally, the depth-direction distance to the subject is calculated based on the ratio of the intensity of the reflected light beam generated from the first illumination light beam to the dummy reflected-light intensity. By obtaining the dummy reflected-light intensity, the difference of the surface reflectance between the wavelengths can be cancelled, thus the depth-direction distance can be precisely obtained. In the aforementioned example, the first illumination light beam has the intensity increasing along the traveling direction thereof while the second illumination light beam has the intensity decreasing the traveling direction thereof. Alternatively, the first illumination light beam may have the intensity that decreases along the traveling direction thereof while the second illumination light beam may have the intensity that increases along the traveling direction thereof. In this case, it is apparent that the dummy reflected-light intensity can be obtained by assuming that a light beam having the first wavelength characteristics has the intensity that increases along the traveling direction thereof.

Figure 23:
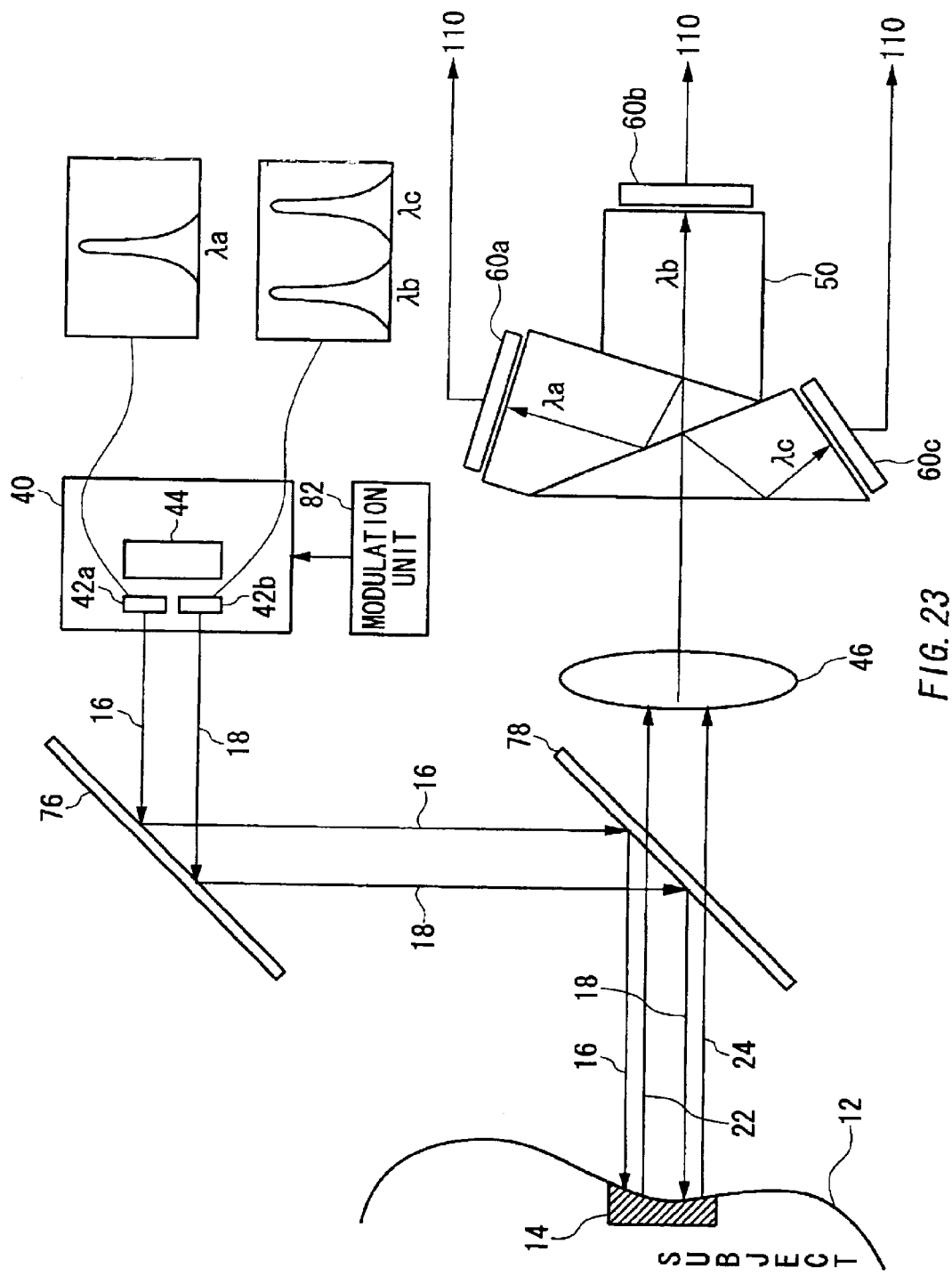
FIG. 23 shows an arrangement of the illumination unit 40 and a capturing unit 100 according to the second embodiment of the present invention.

FIG. 23 shows an exemplary image capturing apparatus according to the present embodiment. The image capturing apparatus of the present embodiment is the same as those described in the first embodiment except that the illumination unit 40 has a different arragement; a modulation unit 82 is used for modulating the intensity of the illuminated light beam; half mirrors 76 and 78 are used in order to make the optical axis of the illumination unit 40 coincident with that of the capturing unit 100; and the depth calculation unit 80 operates in a different manner. As for other components, the same structures as those of the corresponding components in the first embodiment can be used.

The illumination unit 40 includes a light-source unit 44 and optical filters 42a and 42b. The optical filter 42a transmits light having the wavelength λa and wavelengths in the vicinity thereof. The optical filter 42b transmits light having the wavelengths λb and λc and the wavelengths in the vicinity thereof. The light-source unit 40 casts the first illumination light beam that mainly contains the wavelength λa and has the intensity varying along the traveling direction thereof and the second illumination light beam that mainly contains the wavelengths λb and λc and has the intensity varying along the traveling direction thereof, via the optical filter 42a. The modulation unit 82 modulates the intensities of the first and second illumination beams 16 and 18 by temporal modulation. The wavelengths λa, λb and λc are set to the values described in the respective examples of the first embodiment.

The illumination light beams 16 and 18 are reflected by the half mirrors 76 and 78 in that order and are directed to the illuminated portion 14 of the subject 12. Reflected light beams 22 and 24 generated by reflection of the illumination light beams 16 and 18 by the subject 12 pass through the half mirror 78 and are then converged by the optical lens 46 of the capturing unit 100.

Te separation unit 50 separates the reflected light beams into the components of the wavelengths λa, λb and λc. The respective wavelength components separated by the separation unit 50 are received by the light-receiving units 60a, 60b, and 60c, respectively. In accordance with the intensity of the light received by each light-receiving unit 60, an electric signal is generated and read into the processing unit 110. The separation unit 50 and the light-receiving unit 60 may have the same structures and functions as those of the separation unit 50, the light-receiving unit 60 and the processing unit 110 in the respective examples of the first embodiment described with reference to FIGS. 6, 16 and 20.

The processing unit 110 has the same structure as that of the processing unit 110 in the respective examples of the first embodiment described with reference to FIGS. 7, 17 and 21. A method of calculating the dummy reflected-light intensity in the processing unit 110 is the same or similar as/to the calculation method described with reference to FIGS. 8 and 18.

Figure 24:
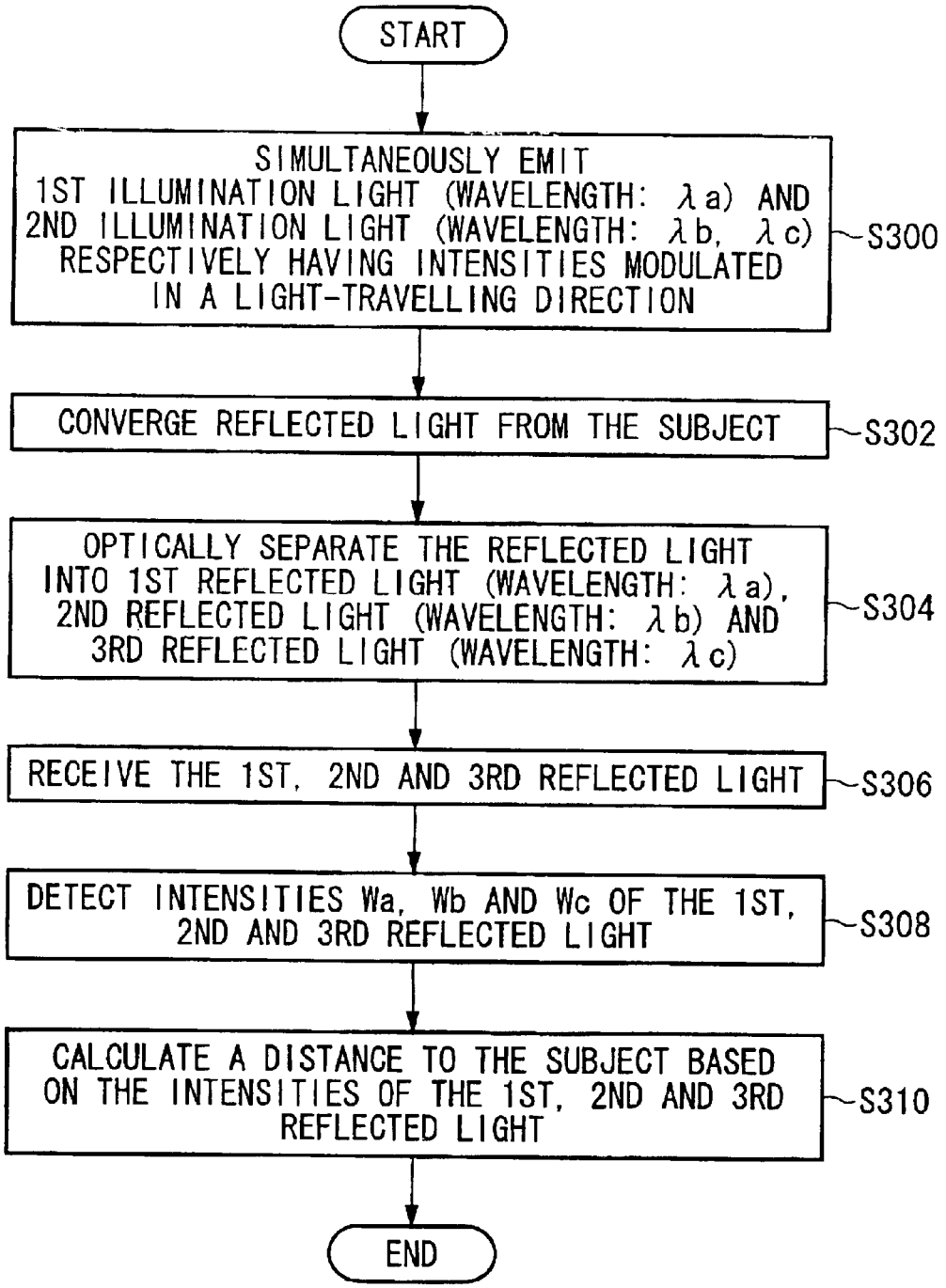
FIG. 24 is a flowchart of a distance measuring method according to the second embodiment of the present invention.

FIG. 24 is a flowchart of an exemplary distance measuring method of the present embodiment. The illumination unit 40 simultaneously casts the first illumination light beam having the wavelength λa and the intensity modulated along the traveling direction thereof and the second illumination light beam that has the wavelengths λb and λc that are different from the wavelength λa and the intensity modulated along the traveling direction thereof. (S300)

The optical lens 46 of the capturing unit 100 converges the reflected light beams of the subject 12 (S202). The separation unit 50 optically separates the reflected light beam from the subject 12 so as to separate the first reflected light beam having the wavelength λa, the second reflected light beam having the wavelength λb, and the third reflected light beam having the wavelength λc (S304).

The light-receiving unit 60 receives the first, second and third reflected light beams (S306). The intensity detector 70 of the processing unit 110 then detects the intensities Wa, Wb and Wc of the first, second and third reflected light beams, respectively (S308).

The depth calculation unit 80 calculates the depth-direction distance to the subject 12 by using the intensities Wa, Wb and Wc of the first, second and third reflected light beams (S310).

Figure 25:
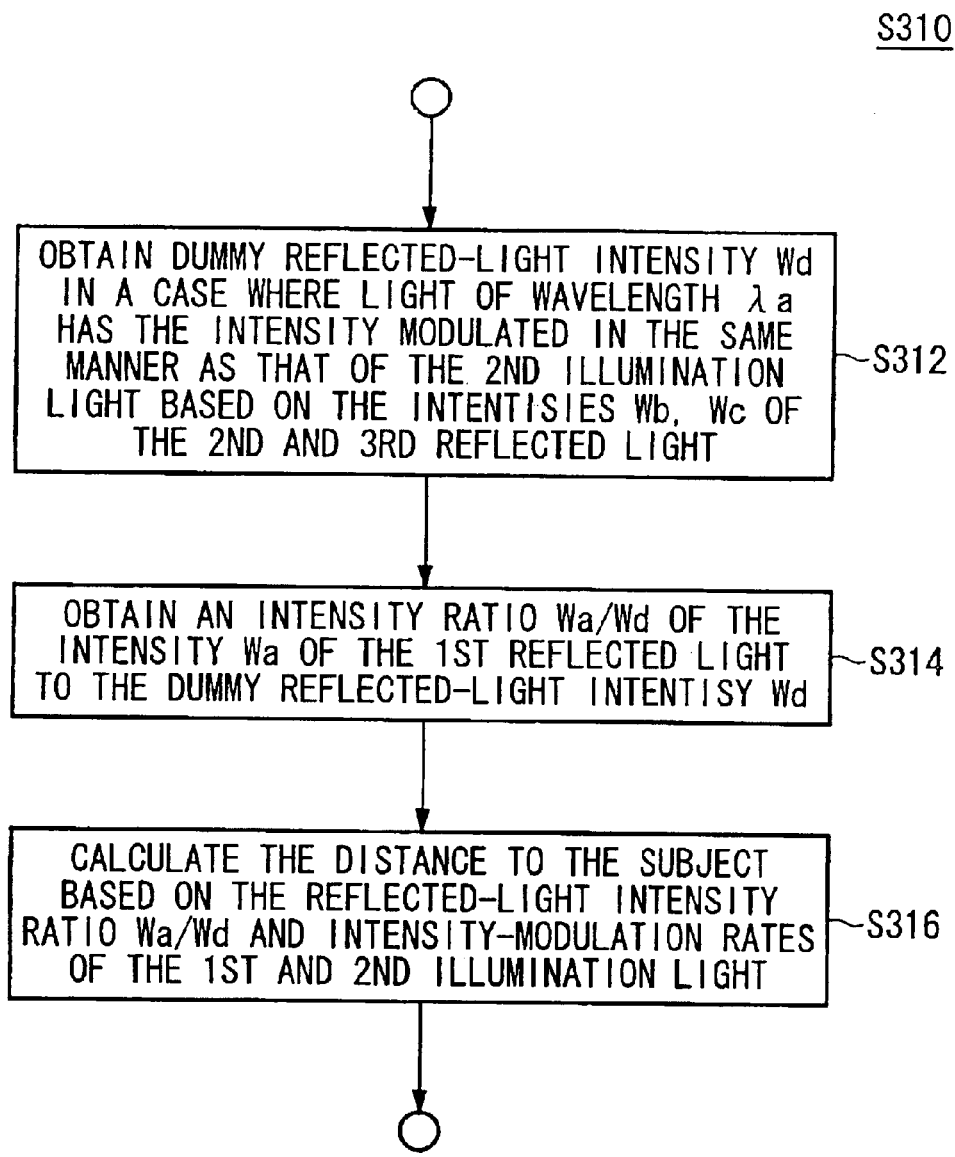
FIG. 25 is a flowchart of a depth calculation process S310.

FIG. 25 is a flowchart of an example of the depth-calculation operation S310. First, the dummy reflected-light intensity Wd in a case of assuming that light having the wavelength λa is modulated in the same manner as the second illumination light beam, is obtained based on the intensities Wb and Wc of the second and third reflected light beams (S312). The dummy reflected-light intensity Wd can be obtained in the same manner described in the respective examples of the first embodiment. Then, the ratio Wa/Wd of the actual intensity Wa of the first reflected light beam to the dummy reflected-light intensity Wd (S314) is obtained. Based on the reflected-light intensity ratio Wa/Wd and the intensity-modulation rates of the first and second illumination light beams, the depth-direction to the subject is calculated (S316).

Figure 26:
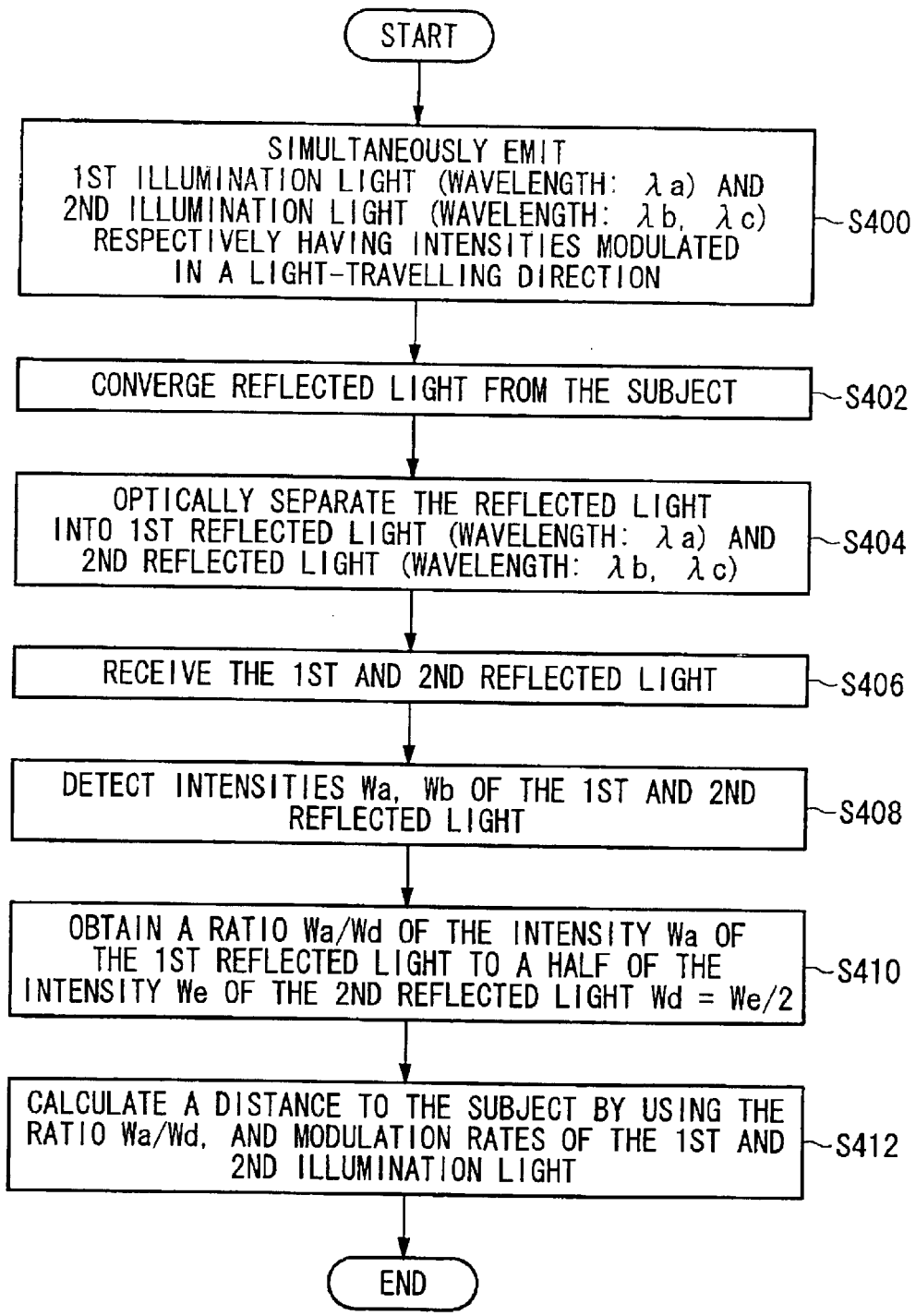
FIG. 26 is a flowchart of a modification of the depth calculation process S310.

FIG. 26 is a flowchart of an example of the distance measuring method according to the present embodiment. In this example, the wavelength λa is the middle wavelength between the wavelengths λb and λc.

The illumination unit 40 casts the first illumination light beam having the wavelength λa and the intensity modulated along the traveling direction of the first illumination light beam and the second illumination light beam having the wavelengths λb and λc onto the subject 12 simultaneously (S400). The optical lens 46 forms the reflected image of the subject 12 onto which the first and second illumination light beams are cast (S402). The separation unit 50 optically separates the reflected light from the subject 12 into the first reflected light beam having the wavelength λa and the second reflected light beam having the wavelengths λb and λc (S404). Then, a ratio Wa/Wd of the intensity Wa of the first reflected light beam to a half of the intensity of the second reflected light beam Wd=We/2 (S410). Based on the reflected-light intensity ratio Wa/Wd and the intensity-modulation rates of the first and second illumination light beams, the depth of the subject 12 is calculated (S412).

As described above, according to the image capturing apparatus of the present invention, illumination light beams having different wavelength characteristics and different intensities are cast onto the subject simultaneously. In this case, the reflected light beams from the subject are subjected to wavelength-separation in accordance with the respective wavelength characteristics. By using the intensities of the reflected light beams thus separated, the depth-direction distance to the subject can be obtained simply.

In the present embodiment, since the optical axis of the illumination light from the illumination unit and that of the reflected light incident on the capturing unit are optically the same, there is no region where the subject illuminated by the illumination unit cannot be captured by the capturing unit because of shadow. Thus, it is possible to calculate the depth distribution in the entire region of the subject illuminated with the illumination light, preventing occurrence of a blind region where the depth-direction distance cannot be calculated. Moreover, by making the optical axes of the illumination unit and the capturing unit optically the same, the size of the image capturing apparatus can be reduced.

In the present embodiment, the intensity of the illumination light is modulated by temporal modulation. Thus, it is desirable that the capturing unit 100 includes a high-speed shutter. The high-speed shutter captures an instantaneous value of the intensity of the light received by the light-receiving unit 60.

As described above, according to the image capturing apparatus and the distance measuring method of the present invention, the light beams that have different wavelength characteristics and have different intensity distributions on the planes perpendicular to the optical axes thereof or the intensities modulated in different manners along the traveling direction thereof are cast onto the subject simultaneously. Then, the reflected light from the subject is optically separated into wavelength components in accordance with the wavelength characteristics so as to measure the intensities, thereby the depth-direction distance to the subject can be calculated easily and simply.

In the above description, the distance to the subject is obtained based on the difference of the intensity between the reflected light beams as an example of outgoing light beams from the subject that is illuminated with light. However, in a case where the subject is a transparent or semitransparent object that can transmit the light, the depth of the subject can be obtained by the difference of the intensity between the transmitted light beams.

As described above, according to the present invention, the depth of a subject can be easily measured by capturing outgoing light from the subject illuminated with light.

Although the present invention has been described by way of exemplary embodiments, it should be understood that many changes and substitutions may be made by those skilled in the art without departing from the spirit and the scope of the present invention which is defined only by the appended claims.

What is claimed is:

1. An image capturing apparatus for obtaining information regarding a depth of a subject, comprising:

an illumination unit operable to cast a first illumination light beam, having a first wavelength as a main component, and a second illumination light beam, having a second wavelength and a third wavelength as main components, said first and second illumination light beams being modulated such that intensities of said first and second illumination light beams are changed along respective traveling directions, said second and third wavelengths being different from said first wavelength; and a depth calculation unit operable to calculate a depth-direction distance to said subject based on outgoing light beams from said subject onto which said first and second illumination light beams are cast.

2. An image capturing apparatus as claimed in claim 1, wherein said first illumination light beam is modulated such that said intensity thereof monotonously increases or decreases along said traveling direction of said first illumination light beam, and said second illumination light beam is modulated such that said intensity thereof monotonously decreases along said traveling direction of said second illumination light beam when said intensity of said first illumination light beam monotonously increases along said traveling direction of said first illumination light beam, or increases along said traveling direction of said second illumination light beam when said intensity of said first illumination light beam monotonously decreases along said traveling direction of said first illumination light beam.

3. An image capturing apparatus as claimed in claim 1, further comprising a modulation unit operable to change said intensities of said first and second illumination light beams by temporal modulation.

4. An image capturing apparatus as claimed in claim 3, wherein said second wavelength is shorter than said first wavelength and said third wavelength is longer than said first wavelength, and said image capturing apparatus further comprises:

an optically converging unit operable to converge said outgoing light beams from said subject onto which said first and second illumination light beams are cast;

a separation unit operable to optically separate said outgoing light beams into a first outgoing light beam having said first wavelength and a second outgoing light beam having said second and third wavelengths;

a light-receiving unit operable to receive said first and second outgoing light beams after being separated by said separation unit and converged by said optically converging unit; and a light intensity detector operable to detect intensities of said first and second outgoing light beams received by said light-receiving unit, wherein said depth calculation unit calculates the depth-direction distance to said subject by said intensities of said first and second outgoing light beams.

5. A distance measuring method for obtaining information regarding a depth of a subject, comprising:

an illumination step for simultaneously casting a first illumination light beam, having a first wavelength as a main component, and a second illumination light beam, having a second wavelength and a third wavelength as main components, said first and second illumination light beams being modulated such that intensities of said first and second illumination light beams are changed along respective traveling directions thereof;

a separation step for optically separating outgoing light beams, from said subject onto which said first and second illumination light beams are cast, into a first outgoing light beam having said first wavelength, a second outgoing light beam having said second wavelength, and a third outgoing light beam having said third wavelength;

a capturing step for capturing said first, second and third outgoing light beams;

a light intensity detection step for detecting intensities of said first, second and third outgoing light beams; and a depth calculation step for calculating a depth-direction distance to said subject based on said intensities of said first, second and third outgoing light beams.

6. A distance measuring method as claimed in claim 5, wherein said depth calculation step includes calculating said depth-direction distance to said subject based on said intensity of said first outgoing light beam and a value based on said intensities of said second and third outgoing light beams.

7. A distance measuring method for obtaining information regarding a depth of a subject, comprising:

an illumination step for simultaneously casting a first illumination light beam, having a first wavelength as a main component, and a second illumination light beam, having a second wavelength and a third wavelength as main components, said first and second illumination light beams being modulated such that intensities of said first and second illumination light beams are changed along respective traveling directions thereof, said second wavelength being shorter than said first wavelength, said third wavelength being longer than said first wavelength;

a separation step for optically separating outgoing light beams, from said subject onto which said first and second illumination light beams are cast, into a first outgoing light beam having said first wavelength and a second outgoing light beam having said second and third wavelengths;

a capturing step for capturing said first and second outgoing light beams;

a light intensity detection step for detecting the intensities of said first and second outgoing light beams; and a depth calculation step for calculating a depth-direction distance to said subject based on said intensities of said first and second outgoing light beams.

* * * * *